United States Patent
Cefkin et al.

(10) Patent No.: US 10,068,285 B2
(45) Date of Patent: Sep. 4, 2018

(54) MULTI-DIMENSIONAL SURFACE-BASED BID MATCHING

(71) Applicant: International Business Machines Corporation, Armonk, NY (US)

(72) Inventors: Melissa Cefkin, San Jose, CA (US); Tobin J. Lehman, Los Gatos, CA (US); Yolanda A. Rankin, San Jose, CA (US); H. Raymond Strong, Jr., San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 755 days.

(21) Appl. No.: 13/869,610

(22) Filed: Apr. 24, 2013

(65) Prior Publication Data

US 2014/0324617 A1 Oct. 30, 2014

(51) Int. Cl.
*G06Q 30/08* (2012.01)
*G06Q 30/06* (2012.01)

(52) U.S. Cl.
CPC ......... *G06Q 30/08* (2013.01); *G06Q 30/0621* (2013.01)

(58) Field of Classification Search
USPC .............................................. 705/26.1, 27.1
See application file for complete search history.

(56) References Cited

U.S. PATENT DOCUMENTS

| | | | |
|---|---|---|---|
| 7,200,570 B1 | 4/2007 | Wu | |
| 7,870,037 B2 * | 1/2011 | Stephens | G06Q 30/0641 705/26.3 |
| 8,145,544 B2 * | 3/2012 | Leal | G06Q 30/02 705/26.1 |
| 2002/0165813 A1 * | 11/2002 | Lee | G06Q 40/04 705/37 |
| 2007/0226082 A1 * | 9/2007 | Leal | G06Q 30/02 705/14.71 |
| 2008/0183614 A1 | 7/2008 | Gujral et al. | |

(Continued)

OTHER PUBLICATIONS

Agrawal et al. The design of a language for model transformations, Software and Systems Modeling 5.3 (Sep. 2006): 261-288, Downloaded from ProQuestDirect on the Internet on Nov. 29, 2015, 29 pages.*

(Continued)

*Primary Examiner* — Nicholas D Rosen
(74) *Attorney, Agent, or Firm* — Cantor Colburn LLP

(57) ABSTRACT

Embodiments relate to multi-dimensional surface-based bid matching. An aspect includes receiving a bid from a first user, the bid comprising a plurality of ranges, wherein each range of the plurality of ranges corresponds to a respective dimension of a plurality of dimensions. Another aspect includes determining a first bid surface in the plurality of dimensions based on the plurality of ranges of the bid of the first user. Another aspect includes modifying the first bid surface based on a match to the bid of the first user, the match comprising a point on a second bid surface corresponding to a bid from a second user. Another aspect includes wherein, if the first user comprises a work requester, the second user comprises a work producer, and if the first user comprises a work producer, the second user comprises a work requester.

17 Claims, 21 Drawing Sheets

(56) References Cited

U.S. PATENT DOCUMENTS

| | | | |
|---|---|---|---|
| 2011/0175911 A1* | 7/2011 | Loop | G06T 17/30 345/423 |
| 2011/0238521 A1 | 9/2011 | Porat et al. | |
| 2011/0276452 A1* | 11/2011 | Stephens | G06Q 10/087 705/35 |
| 2012/0246020 A1* | 9/2012 | Kersten | G06Q 30/0611 705/26.3 |
| 2013/0185187 A1* | 7/2013 | Vasinkevich | G06Q 40/04 705/37 |

OTHER PUBLICATIONS

Bockman, Ed. Getting the Most from Online Auctions, Chemical Engineering 107.11 (Oct. 2000): 133-134,136. Downloaded from ProQuestDirect on the Internet on Nov. 29, 2015, 4 pages.*

* cited by examiner

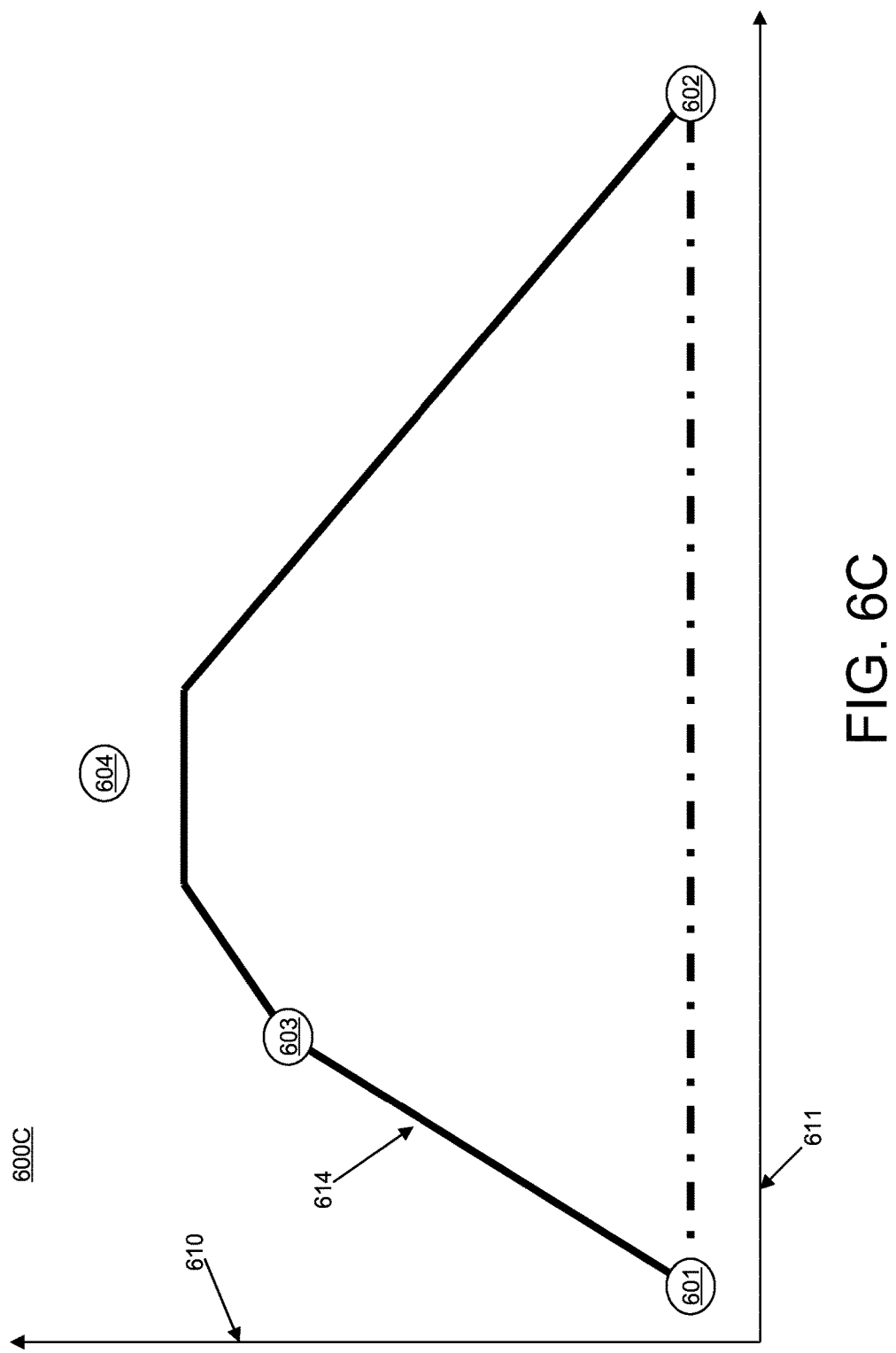

MULTI-DIMENSIONAL SURFACE-BASED BID MATCHING

BACKGROUND

The present disclosure relates generally to bid matching, and more specifically, to multi-dimensional surface-based bid matching.

In a marketplace, bids from work requesters and work producers must be matched in order to form contracts. Work may be treated as a one-dimensional quantity for which a single rate of payment is bid by a work requester, and a single rate of payment is asked by a work producer. A match may be determined between a work requester and a work producer when the bid rate is greater than or equal to the asked rate. A bid from a work requester may further specify exactly what is to be done in order to complete the work, and under what conditions the work should be completed. However, a work requester may have relatively little guidance as to market rates for work under specified conditions, including the market value of deadlines, quality specifications, or service levels that may be desired by the work requester. Work producers may also face such issues when formulating bids.

BRIEF SUMMARY

Embodiments include a method, system, and computer program product for multi-dimensional surface-based bid matching. An aspect includes receiving a bid from a first user, the bid comprising a plurality of ranges, wherein each range of the plurality of ranges corresponds to a respective dimension of a plurality of dimensions, wherein the first user comprises one of a work requester and a work producer. Another aspect includes determining a first bid surface in the plurality of dimensions based on the plurality of ranges of the bid of the first user. Another aspect includes modifying the first bid surface based on a match to the bid of the first user, the match comprising a point on a second bid surface corresponding to a bid from a second user. Another aspect includes wherein, if the first user comprises a work requester, the second user comprises a work producer, and if the first user comprises a work producer, the second user comprises a work requester.

Additional embodiments include a method for multi-dimensional surface-based bid matching. An aspect includes determining a first bid surface corresponding to a bid of a first user, the first bid surface being defined in a first plurality of dimensions, the first plurality of dimensions comprising at least a price and/or rate dimension. Another aspect includes determining a second bid surface corresponding to a bid of a second user, the second bid surface being defined in a second plurality of dimensions, the second plurality of dimensions comprising at least the price and/or rate dimension. Another aspect includes determining whether the first bid surface and the second bid surface intersect, and based on determining that the first surface and the second surface do not intersect: determining a closest point in the price and/or rate dimension on the second bid surface to the first bid surface; and modifying the first bid surface to include the closest point in the price or rate dimension on the second bid surface.

Additional embodiments include a method for matching work to worker in a marketplace. An aspect includes receiving a work request from a first entity, wherein the work request from the first entity includes a first rate of payment that varies in one or more dimensions, the one or more dimensions comprising at least one of quantity, deadline, total duration, and rate of work per unit time, wherein requesting work by the first entity comprises. Another aspect includes matching the requested work to a bid corresponding to a second entity, wherein the bid corresponding to the second entity offers a second rate of payment that varies in a one or more dimensions comprising at least one of quantity, deadline, total duration, and rate of work per unit time. Another aspect includes wherein matching the requested work to the bid comprises: receiving, via a user interface, an initial rate of payment comprising a single point over the plurality of dimensions from the first entity; based on receiving a request from the first entity to increase or decrease a number of matches to the work request of the first entity: detecting a set of current matches match to the work request based on an intersection of the surface corresponding to the work request and a surface corresponding to a bid of the plurality of bids, the intersection comprises a predetermined minimum distance; display a set of current matches to the first entity, wherein each of the set of current matches are represented based on a closest point between the surface corresponding to the work request and a surface corresponding to a bid of the plurality of bids on the matching surface; determining a non-flat surface corresponding to the work request of the first entity based the set of current matches, wherein the work request and the plurality of bids are each maintained as a respective surface comprising a convex hull; displaying a competing work request for a match of the set of current matches by a third entity to the first entity; receiving a request from the first entity to accept a match of the set of current matches as a tender; and creating a binding agreement between the first entity and the second entity corresponding to the accepted match based on the tender.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIGS. 6A-C depict graphs of removing a match from a bid for multi-dimensional surface-based bid matching in accordance with an embodiment;

DETAILED DESCRIPTION

Figure 1:
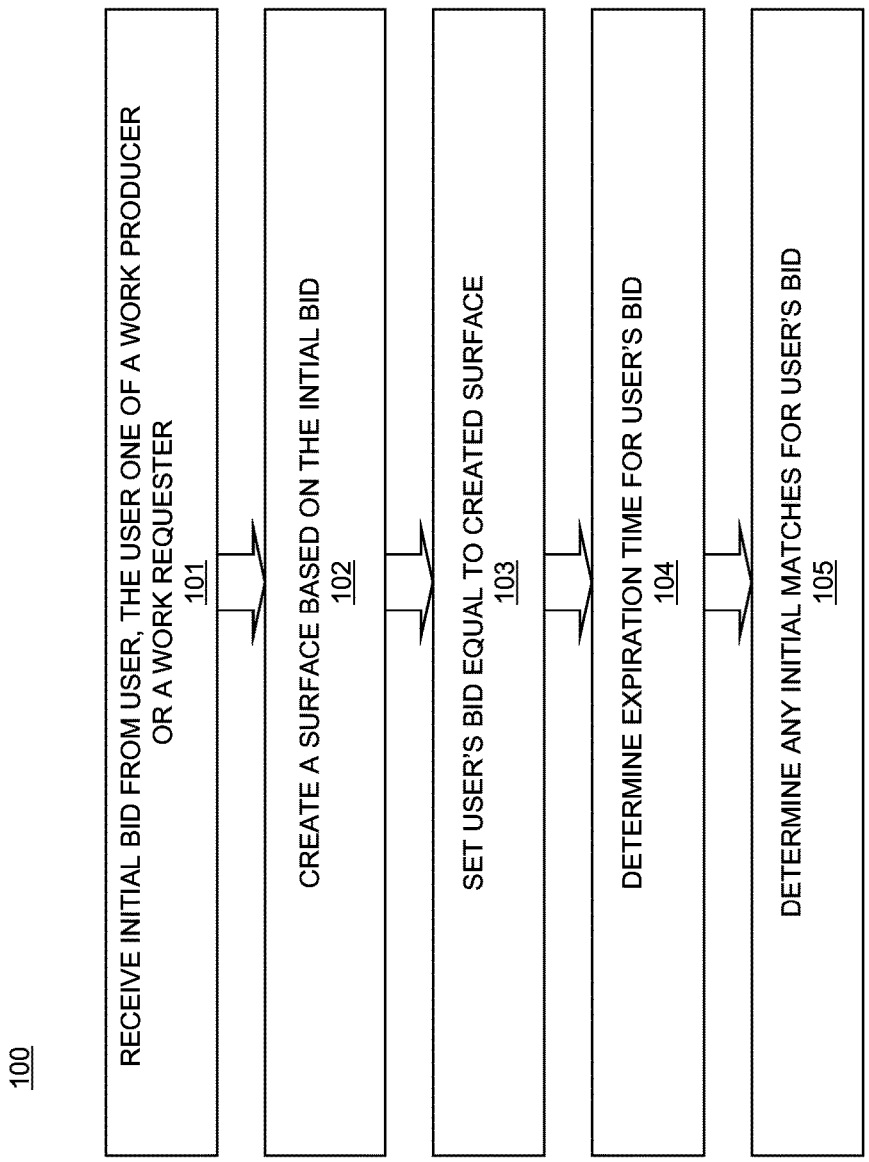
FIG. 1 depicts a process flow of a method for creating a bid for multi-dimensional surface-based bid matching in accordance with an embodiment.

Embodiments described herein are directed to multi-dimensional surface-based bid matching. A user, who may be either a work requester or a work producer, may specify ranges in one or more work dimensions to construct a bid. These ranges in the one or more work dimensions are then used to create a surface representing the bid. Matches are then determined based on whether the surface representing the bid intersects with another surface representing a bid of the opposite type (i.e., work producer or work requester). A point corresponding to an intersection is displayed to the user as a match. The user's bid surface may be modified to add or remove matches, and the user may select a match as to offer a tender, which may be accepted to form a contract.

Each bid in the multi-dimensional surface-based bid matching system is represented by a respective surface; however, these surfaces are internal to the system, and are not displayed to any user. A surface representing a bid may comprise a hypersurface over the multi-dimensional work space, and may be determined based on convex hull calculations using the one or more ranges specified by the user in constructing the bid, in addition to any matches that are added and/or removed from the bid, in some embodiments. In other embodiments the surface may be determined using other surface-modifying transformations in addition to convex hull. For example, one or more dimensions may be transformed by changing to a log scale before taking the convex hull. Various user input means, such as sliders, may be provided in a user interface to modify a bid by, for example, adding and/or removing matches. Modification of bids based on matches with other bids of the opposite type allows development of a market-driven hypersurface. For example, based on a user request to see more or fewer matches, a bid that was initially entered by the user as a flat rate may be adjusted to a non-flat surface using a heuristic surface modification that depends on all bids in the system by maintaining each bid surface as a convex hull. Matches are determined based on intersections of surfaces; in some embodiments an intersection may be modified to include the addition of a predefined distance corresponding to a commission.

To add matches to a user's bid, a match may be determined based on the closest point to the user's bid surface on another bid surface that does not currently intersect the user's bid surface, and the user's bid may be modified to include this closest point. In some embodiments, the closest point may be determined based on a pair of bid surface points from distinct non-intersecting bid surfaces of opposite types that are associated with the same point in the work space. The pair of bid points may comprise a closest pair that is determined based on the point in the work space that is the center of the inverse image of the set of pairs of bid surface points having the lowest distance between them in the price, or rate, dimension. The distance between the two bid surfaces is therefore the distance between the closest pair; each point of the closest pair may be referred to as the closest point in its respective bid surface to the other bid surface. This determination of closest point may be applied for continuous dimensions; in discrete dimensions with no well-defined center, ties may be broken heuristically. In various embodiments, the closest point may be determined based on a pair of bid surface points associated with some unique point in the inverse image of the set of pairs of bid surface points having the lowest distance between them in the price, or rate, dimension.

The representation to the user of the closest point may be moved away from the user's bid surface by the predetermined amount to allow for a commission in some embodiments. A bid may expire after an elapsing of an expiration time period, which may be specified by the owner of the bid. The aging of a match may be represented as motion over time in the user interface; an expired match may leave the visible frame. The user may also view competing bids (i.e., bids that are of the same type as the user's bid) with respect to a specific match. The surface corresponding to a competing bid may be represented by a single point in the viewing frame. Embodiments of multi-dimensional surface-based bid matching may be incorporated into a system that hosts a multi-dimensional auction for work contracts. The user interface for such an auction may be accessed using, for example, a web browser. The auction may receive, and determine matches between, bids from the two types of participants, i.e., work requesters and work producers.

Each user may bid or ask varying rates of payment that may vary depending on ranges that may be specified in multiple dimensions. These dimensions include but are not limited to: quantity, deadline, amount of work per unit time (e.g., hours per day or days per week), volume of work, total duration over which work is to be performed (deadlines and penalties can be built into the price function), initial date/time for starting the work (for example, a bonus may be offered for a fast start from the point of view of a work requester, while capacity constraints may be incorporated from the point of view of a work producer), and location at which the work is to be performed (which may be a discrete dimension in which any offering is binary). Work dimensions may be continuous or discrete in various embodiments. Any discrete work dimensions may describe the type of work in a way that defines the potential matches independent of rate or price.

If a bid is not defined in a particular dimension, then there can be no match to another bid based on that dimension. At any point in the multi-dimensional workspace where a first bid and a second bid of the opposite type are defined, a match may be determined when the bid amount exceeds the asked amount by a fixed, system defined minimum amount corresponding to a commission. Both the work requester and work producer may be notified of the match, and, in some embodiments, may be further notified of the subspace of the match, or a system-suggested point within the subspace of the match. Full details and a response time corresponding to an expiration period may also be shown for the match.

In some embodiments, modification of the surface corresponding to a bid may be performed by raising or lowering the surface in a particular dimension by a user-defined percentage (for example, the user may move a slider in the user interface); matches may or may not be added by such modification. A desired number of matches may be explicitly added or removed by raising the surface at specific points to include nearby potential matches, or lowering the surface to exclude specific matches. The new surface may be determined based on convex hull calculations of the new set of matches. The surface may also be modified to move the surface a specified distance closer to or farther away from a specific match.

Turning now to FIG. 1, a process flow of a method 100 for creating a bid in accordance with an embodiment is generally shown. A bid may be entered into a multi-dimensional surface-based bid matching system by a user via any appropriate user interface that implements method 100 of FIG. 1. In block 101, the user enters an initial bid. In some embodiments of block 101, the user may input a flat pay rate for an initial bid during block 101, and various dimensions and ranges may be incorporated into the bid later based on potential matches in the system; this is discussed below with respect to FIGS. 3-8. In other embodiments of block 101, the user may select one or more dimensions for their initial bid, and input ranges within those dimensions via the user interface. The user may specify pay (i.e., rate or price) that may vary across the ranges in the various dimensions that are specified for the bid. The user is one of a work producer or a work requester, and is seeking to be matched with bids of the opposite type. The dimensions that the rate or price may vary across may include but are not limited to: quantity, deadline, amount of work per unit time, volume of work, total duration over which work is to be performed, initial date/time for starting the work, and location at which the work is to be performed.

Figure 2:
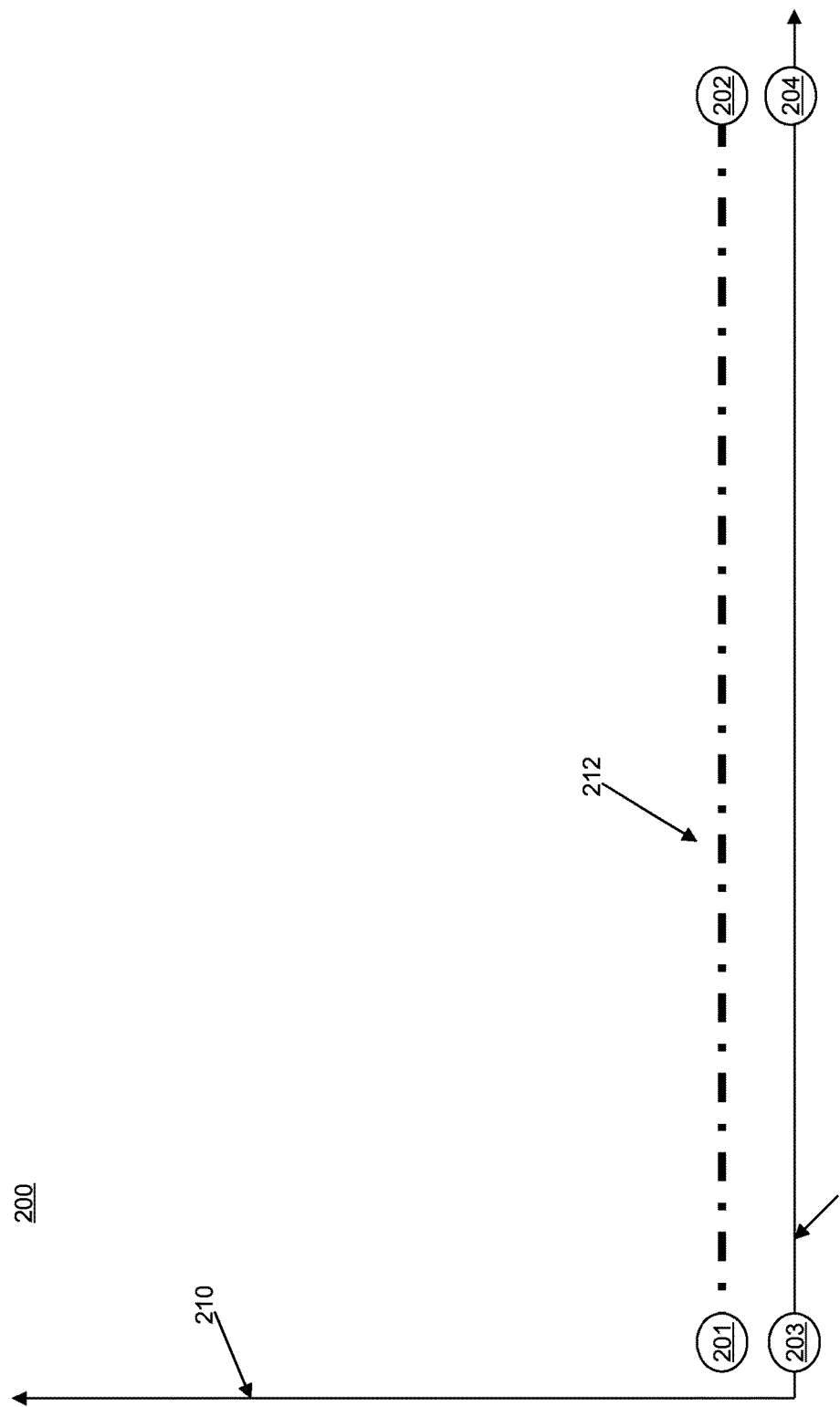
FIG. 2 depicts a graph of a bid for multi-dimensional surface-based bid matching in accordance with an embodiment.

Then, in block 102, a surface is created based on the initial bid that was input in block 101. The surface may comprise a hypersurface, and, in some embodiments may be created by taking the convex hull of any dimensions and ranges that were input by the user in block 101. In other embodiments the surface may be determined in block 102 using other surface-modifying transformations in addition to convex hull. For example, one or more dimensions may be transformed by changing to a log scale before taking the convex hull. Next, in block 103, the user's bid is set equal to the surface that was created in block 102. The surface is used within the system, and may not be displayed to the user in some embodiments. In block 104, an expiration time is determined for the user's bid. This expiration time may be a predetermined by the system in some embodiments; in other embodiments the user may enter an expiration time for their bid. Lastly, in block 105, an initial set of matches for the user's bid is determined based on surfaces corresponding to bids of the opposite type that are in the system. If the surface of another bid of the opposite type intersects the surface of the user's bid, a point on the other bid surface in the set of points having the deepest intersection is chosen as a closest point, or match, to the user's bid. The choice of the closest point may be a point associated with the center of the inverse image of the points of deepest intersection. An intersection may be modified to include a commission in some embodiments. FIG. 2 depicts an embodiment of a graph 200 of a bid surface 212 that may be created by method 100 of FIG. 1 in accordance with an embodiment. Graph 200 is a 2-dimensional graph in which dimension 210 is the price dimension and dimension 211 contains the work space delimited by points 203 and 204. Points 203 and 204 define the limits of a range corresponding to the user's bid within dimension 211. Dimension 211 may be, in various embodiments, one of quantity, deadline, amount of work per unit time, volume of work, total duration over which work is to be performed, initial date/time for starting the work, and location at which the work is to be performed. Points 201 and 202 are points associated with points 203 and 204, respectively, on the bid surface 212. In embodiments comprising a higher-dimension work space, the analogous points to 201 and 202 may be the vertices of a hyper rectangle and the analogous points to points 203 and 204 may be the points on the bid surface associated with the vertices of the hyper rectangle. The one-dimensional work space shown in FIG. 2 is for illustrative purposes only; multi-dimensional surface-based bid matching may be performed in any appropriate number of dimensions. As shown in FIG. 2, there are no initial matches to the bid surface 212 of graph 200. The surface corresponding to graph 200 is not shown to the user.

Figure 3:
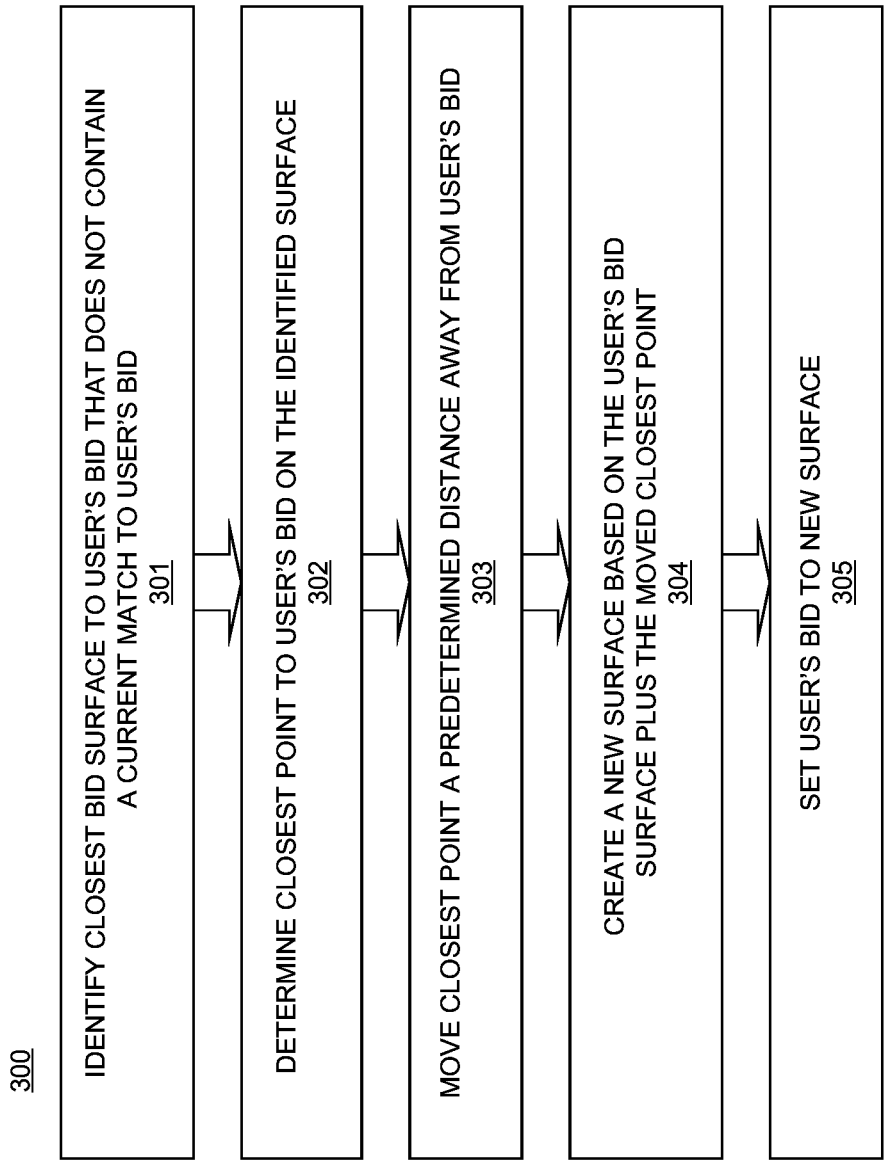
FIG. 3 depicts a process flow of a method for adding a match to a bid for multi-dimensional surface-based bid matching in accordance with an embodiment.
Figure 4A:
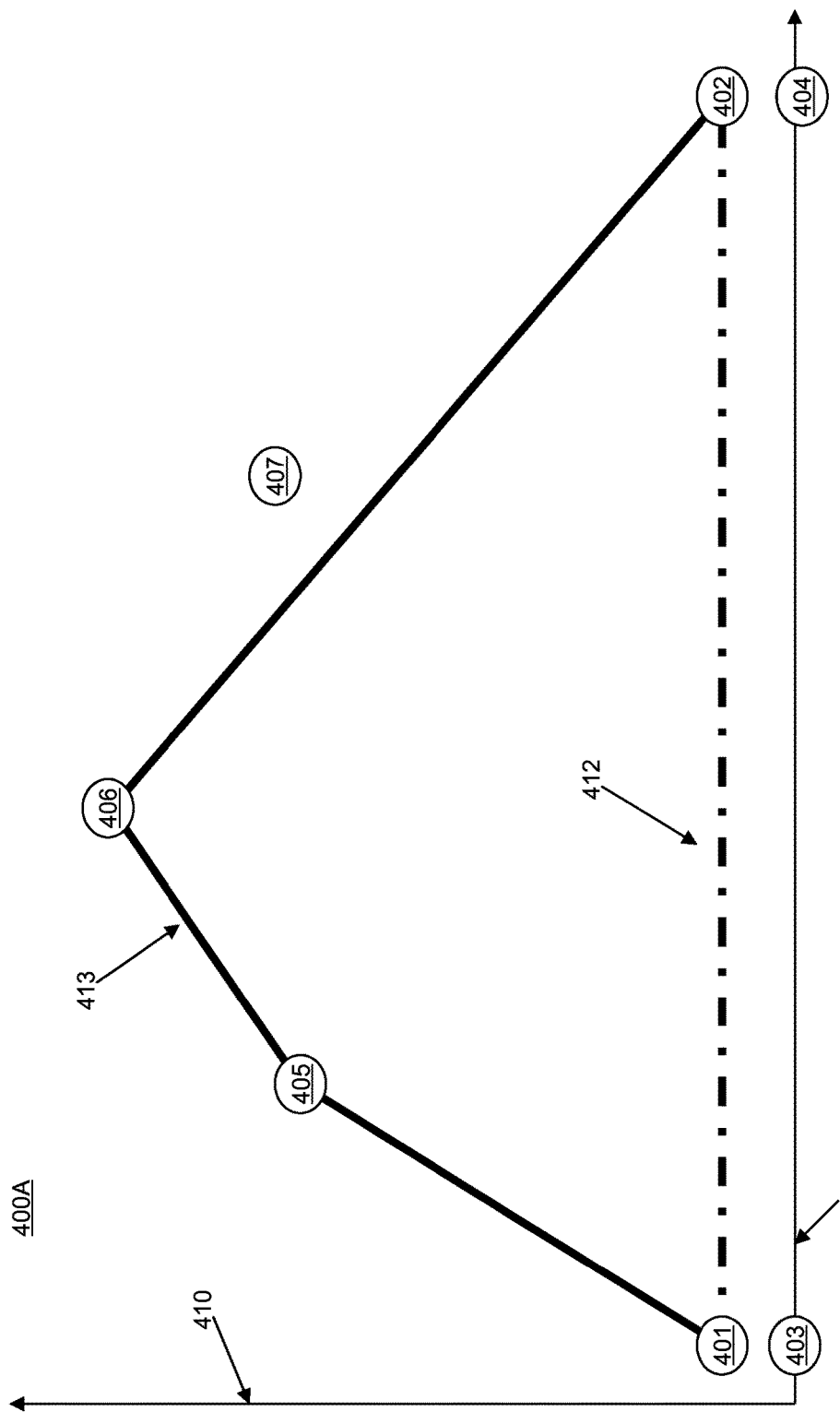
FIGS. 4A-D depict graphs of adding a match to a bid for multi-dimensional surface-based bid matching in accordance with an embodiment.

The surface corresponding to a bid that is entered according to method 100 of FIG. 1 may be modified as is discussed below with respect to FIGS. 3-8B. Turning now to FIG. 3, a process flow of a method 300 for adding a match to a bid in accordance with an embodiment is generally shown. First, in block 301, a closest bid surface of the opposite type (i.e., work requester or work producer) to the user's bid that is not a current match to (i.e., does not currently intersect) the user's bid is identified. Next, in block 302, a closest point on the closest bid surface to the user's bid surface that was identified in block 301 is determined. This is illustrated in FIG. 4A, which shows an embodiment of a graph 400A in dimensions 410 and 411. Dimension 410 may comprise price or rate, and dimension 411 may be, in various embodiments, one of quantity, deadline, amount of work per unit time, volume of work, total duration over which work is to be performed, initial date/time for starting the work, and location at which the work is to be performed. FIG. 4A shows the user's initial bid surface 412 defined by points 401 and 402 and associated points 403 and 404 (as was shown in FIG. 2), and the user's current bid surface 413, which includes matches 405 and 406. Match 407 is identified in block 301 as the closest bid point on another bid surface (not shown) to the current bid surface 413. In some embodiments, the closest point comprising match 407 may be determined based on a pair of bid surface points from distinct non-intersecting bid surfaces of opposite types that are associated with the same point in the work space. The pair of bid points may comprise a closest pair that is determined based on the point in the work space being the center of the inverse image of the set of pairs of bid surface points having the lowest distance between them in the price, or rate, dimension. The distance between the two bid surfaces is therefore the distance between the closest pair; each point of the closest pair may be referred to as the closest point in its respective bid surface to the other bid surface. This determination of closest point may be applied for continuous dimensions; in discrete dimensions with no well-defined center, ties may be broken heuristically. In various embodiments, the closest point may be determined based on a pair of bid surface points associated with some unique point in the inverse image of the set of pairs of bid surface points having the lowest distance between them in the price, or rate, dimension.

Figure 4B:
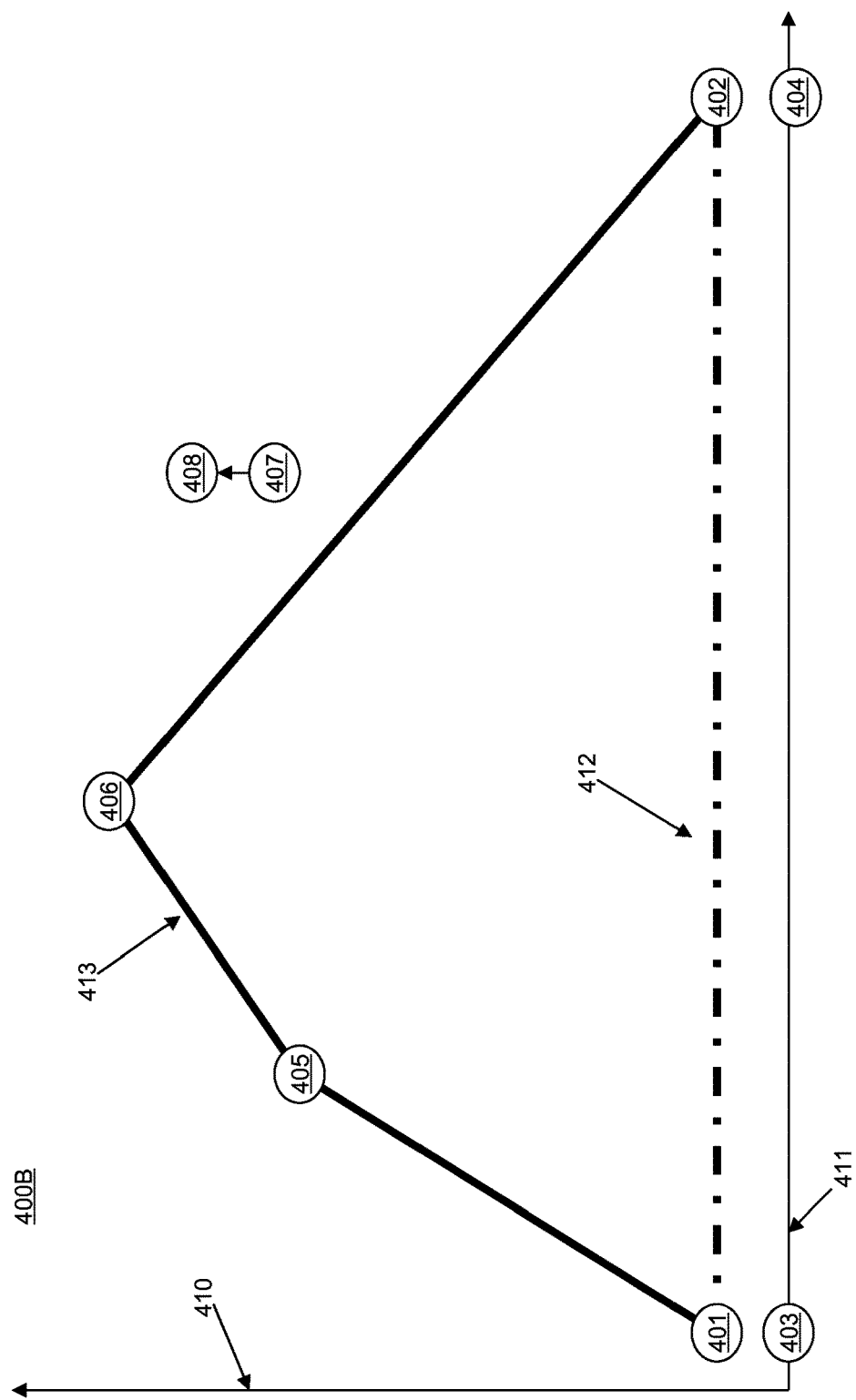
Figure 4C:
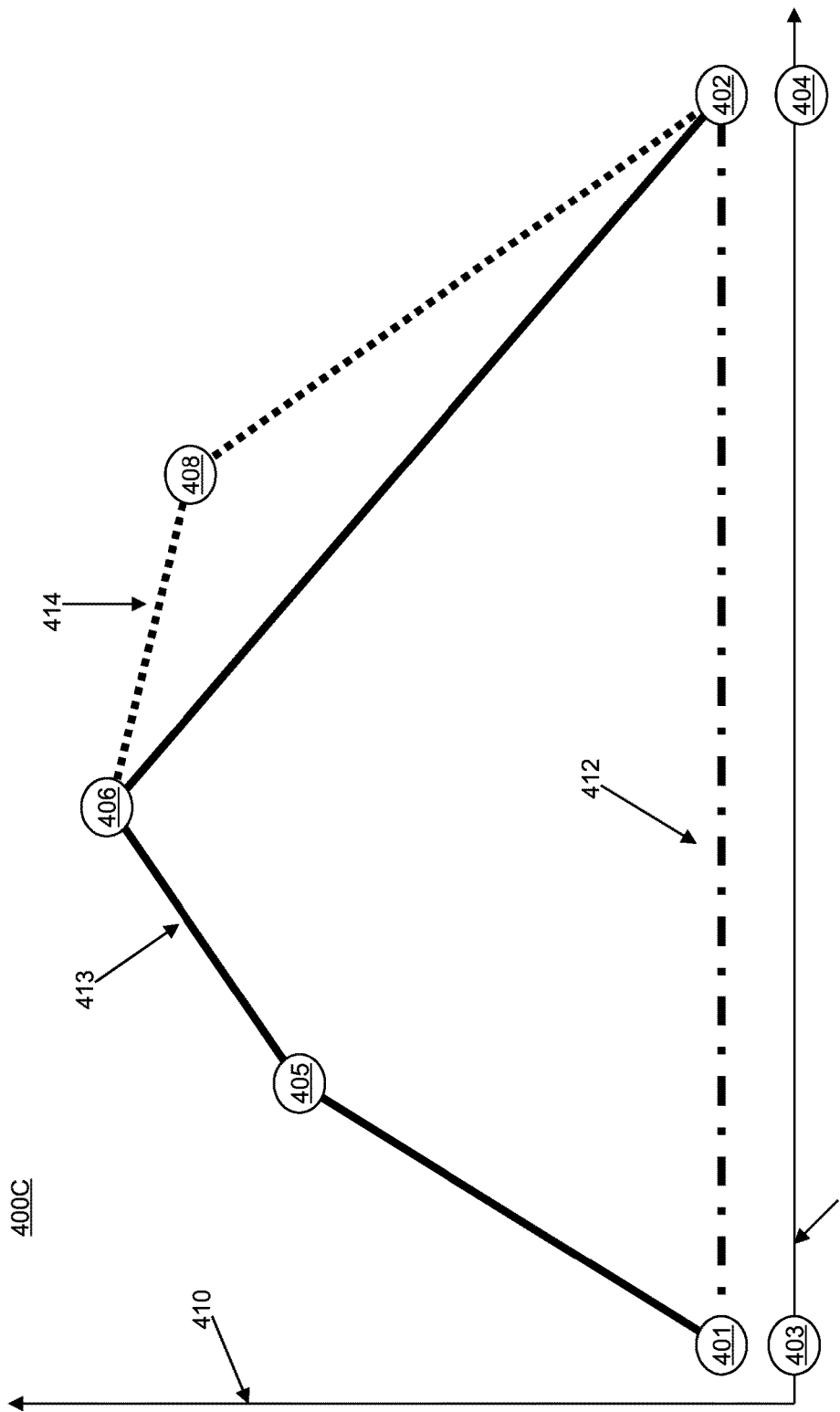
Figure 4D:
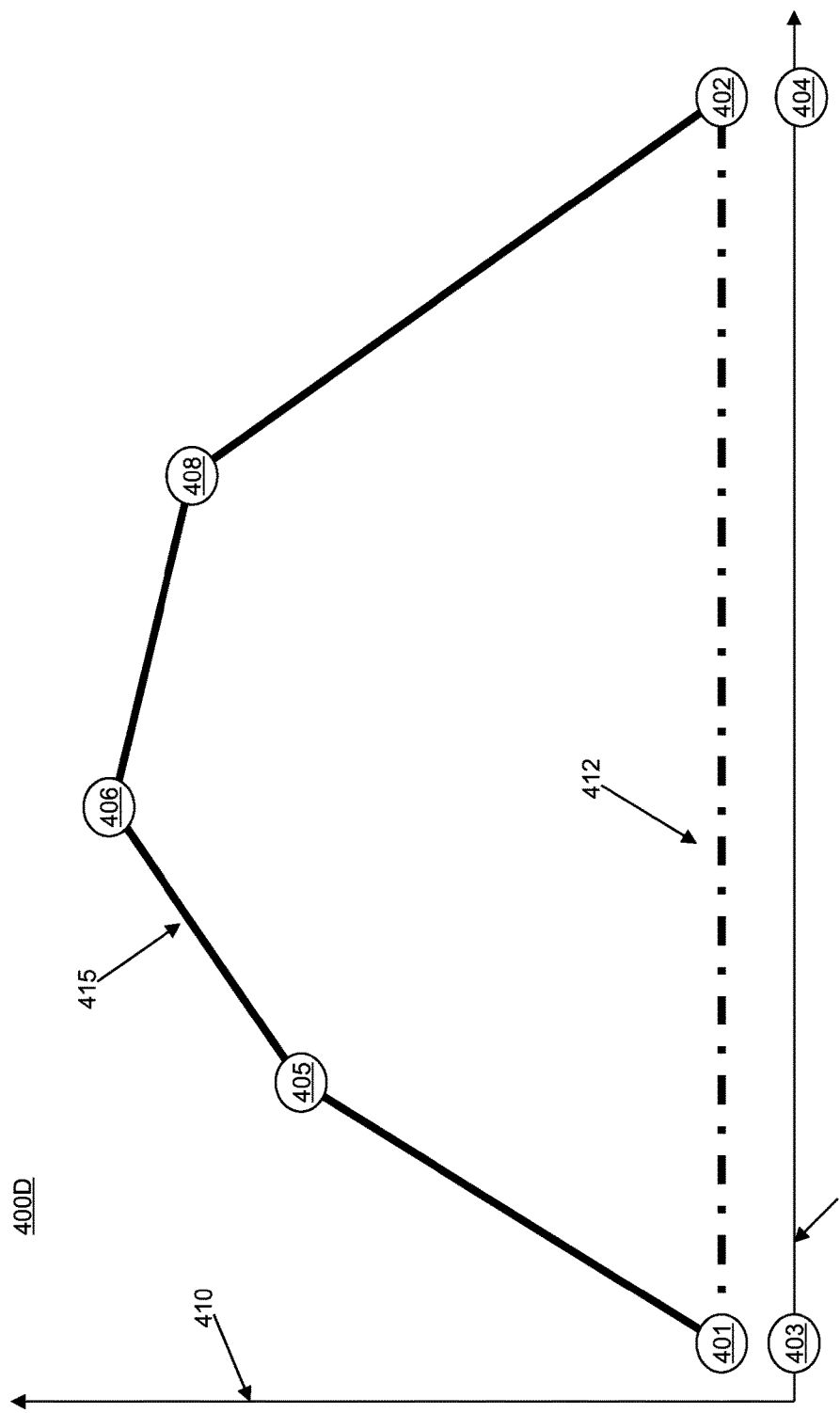

Next, in block 303, match 407 is moved a predetermined distance away from the bid surface 413. This predetermined distance corresponds to a commission, and may be any appropriate amount. This is illustrated in FIG. 4B, which shows an embodiment of a graph 400B in which moved match 408 is equal to the match 407 plus the predetermined distance away from bid surface 413. Then, in block 304, a new surface is created based on the current bid surface and the moved match. The new surface may comprise a hypersurface, and may be created by taking the convex hull of the current matches and the moved match. This is illustrated in FIG. 4C, which shows an embodiment of a graph 400C with new surface 414 that is calculated based on bid surface 413 and match 408. Lastly, in block 305, the user's bid is set equal to the new bid surface that was created in block 304. This is illustrated in FIG. 4D, which shows an embodiment of a graph 400D with the new bid surface 415 that corresponds to the user's bid and includes matches 405, 406, and 408, and also range endpoints 401 and 402. In some embodiments, application of method 300 to a user's bid surface may result in addition of more than one match.

Figure 5:
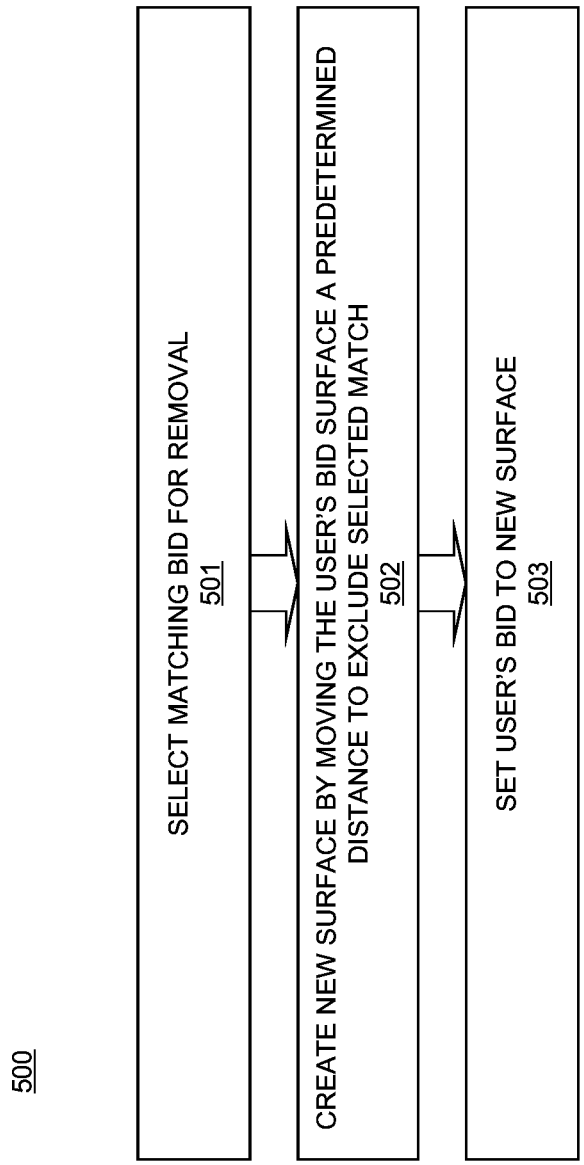
FIG. 5 depicts a process flow of a method for removing a match from a bid for multi-dimensional surface-based bid matching in accordance with an embodiment.
Figure 6A:
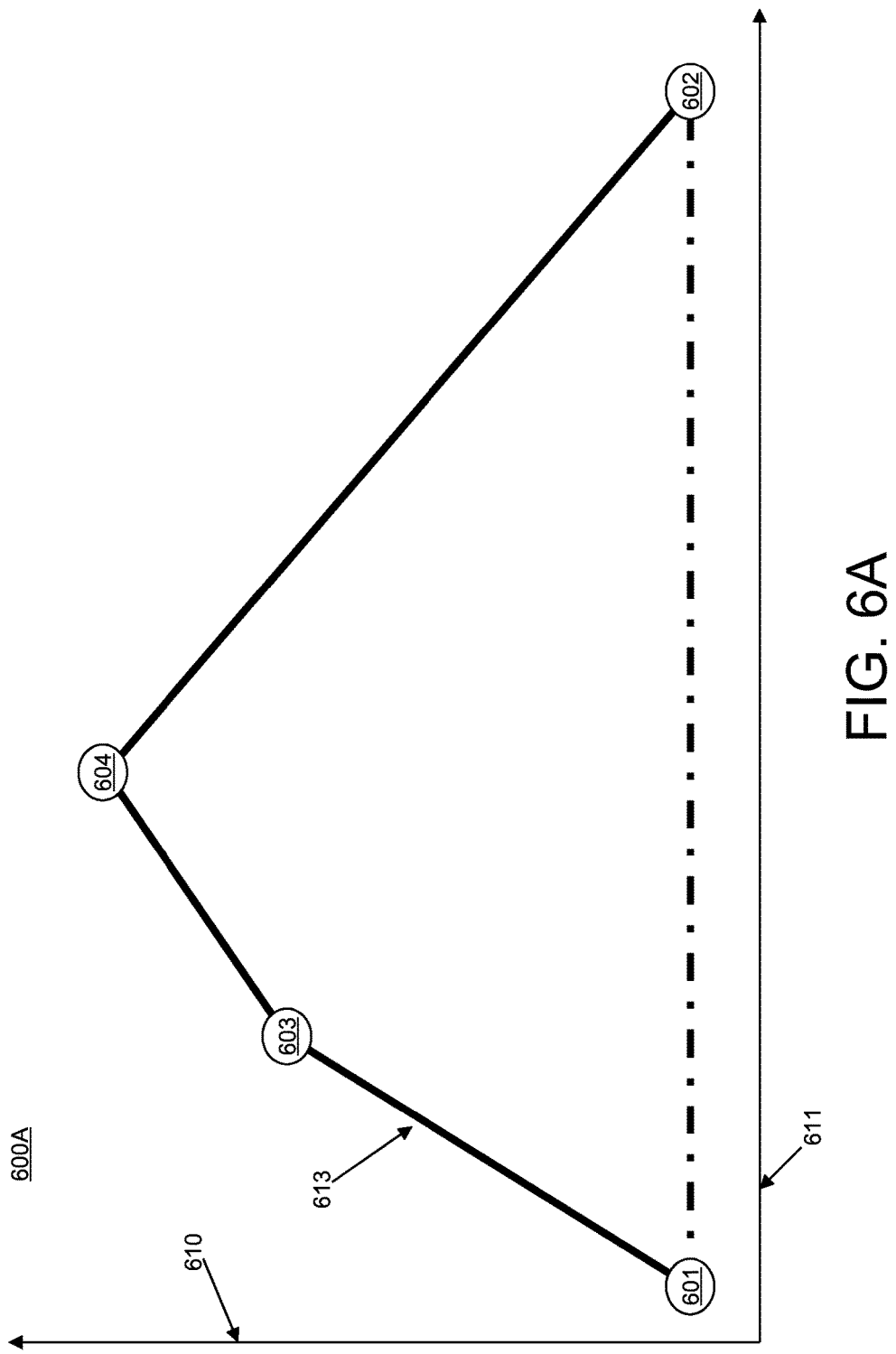
Figure 6B:
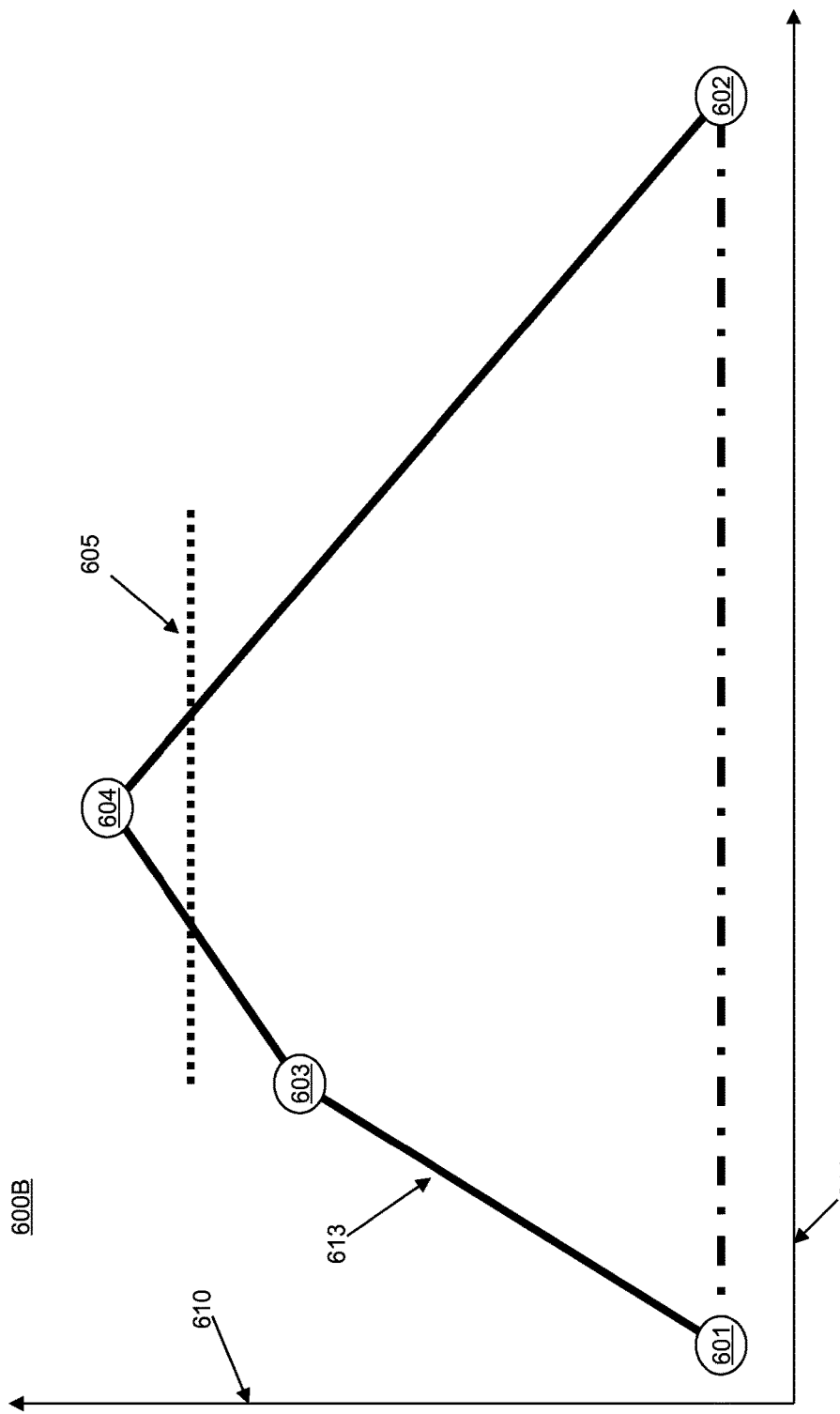

The surface of a bid that was entered using method 100 of FIG. 1 may also be modified in order to remove matches. Turning now to FIG. 5, a process flow of a method 500 for removing a match from a bid in accordance with a first embodiment is generally shown. First, in block 501, a match is selected for removal from the set of current matches to the user's bid. The match may be explicitly selected for removal by the user in some embodiments. In other embodiments, the user may instruct the system via the user interface to reduce the number of matches automatically; in such an embodiment, a match having a highest value within a particular dimension may be selected for removal. This is illustrated in FIG. 6A, which shows a graph 600A in dimensions 610 and 611 of a bid surface 613 that includes matches 603 and 604. Dimension 610 may comprise price or rate, and dimension 611 may be, in various embodiments, one of quantity, deadline, amount of work per unit time, volume of work, total duration over which work is to be performed, initial date/time for starting the work, and location at which the work is to be performed. Match 604 may be selected in block 501 for removal, either by the user or by the system in various embodiments. In an embodiment in which the user instructs the system to remove a match in a particular dimension, the particular dimension may be dimension 610. Next, in block 502, a new surface is created by moving the user's current bid surface a predetermined distance below the selected match. This is illustrated in FIG. 6B, which shows a graph 600B with line 605 representing a predetermined distance in dimension 610 from selected match 604. Next, in block 503, the user's bid surface is set equal to the surface that was created in block 502. This is illustrated in FIG. 6C, which shows a graph 600C with bid surface 614 that was determined based on bid surface 613 and line 605 to exclude match 604. In some embodiments, application of method 500 to a bid surface may remove more than one match; in such embodiments, any removed matches, except for the match that was selected in block 501, may be re-added to the user's bid surface using method 300 of FIG. 3 that was described above. However, it may not be possible to remove exactly one specific match without removing any other matches in some embodiments.

Figure 7:
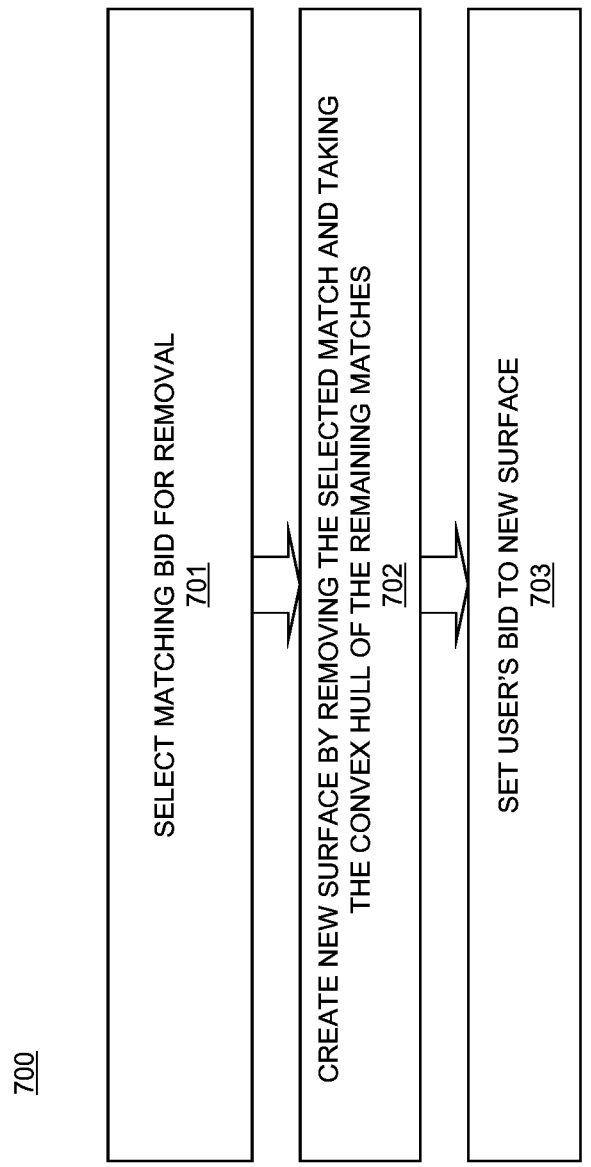
FIG. 7 depicts a process flow of a method for removing a match from a bid for multi-dimensional surface-based bid matching in accordance with an embodiment.
Figure 8A:
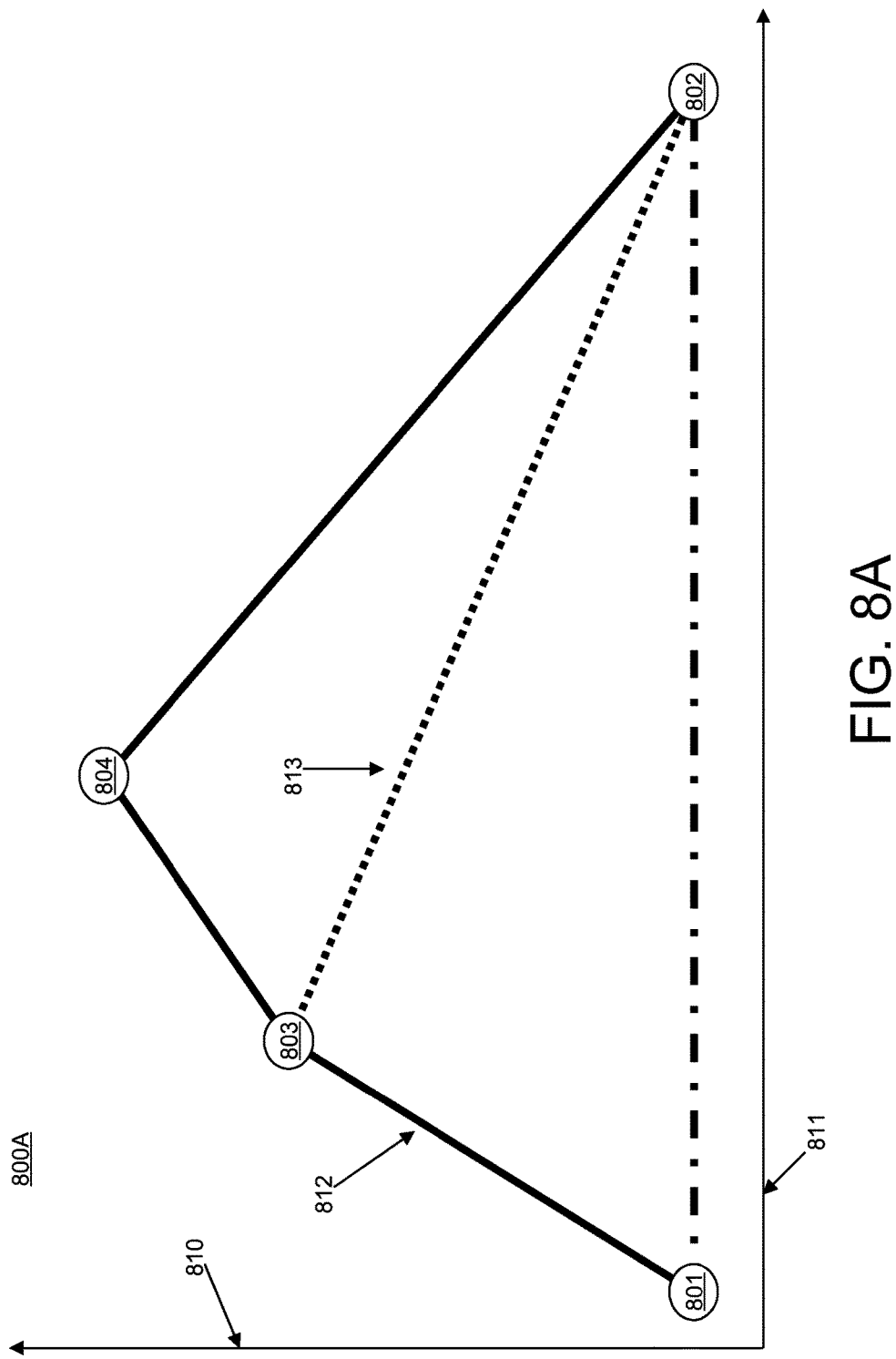
FIGS. 8A-B depict graphs of removing a match from a bid for multi-dimensional surface-based bid matching in accordance with an embodiment.
Figure 8B:
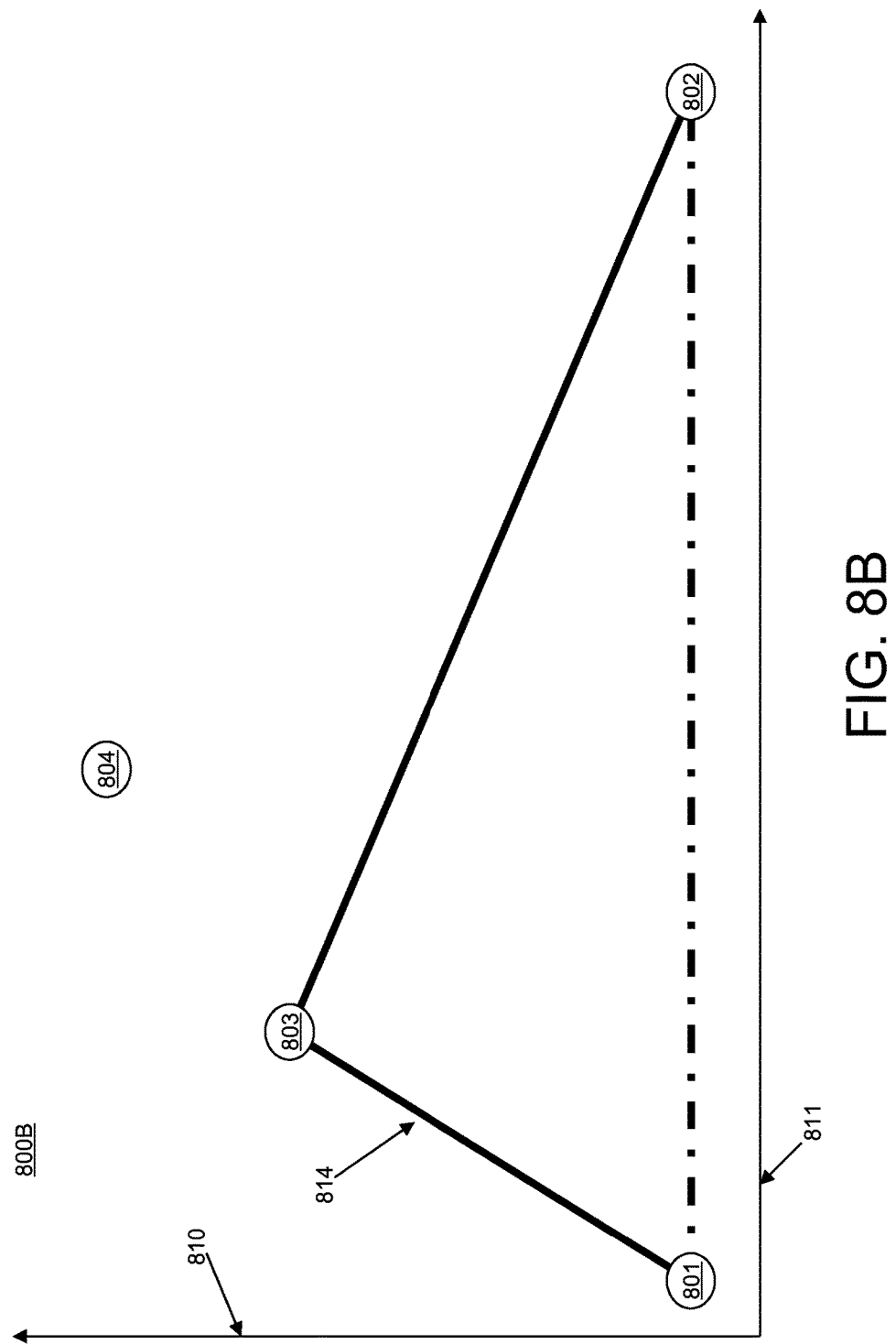

Turning now to FIG. 7, a process flow of another method 700 for removing a match from a bid in accordance with a second embodiment is generally shown. First, in block 701, a match is selected for removal from the set of current matches to the user's bid. The match may be explicitly selected for removal by the user in some embodiments. In other embodiments, the user may instruct the system via the user interface to reduce the number of matches automatically; in such an embodiment, a match having a highest value within a particular dimension may be selected for removal. Next, in block 702, a new surface is created based on the remaining matches that define the user's bid surface, excluding the match that was selected in block 701. The new surface may be determined by taking the convex hull of the remaining matches and range end points. This is illustrated in FIG. 8A, which shows an embodiment of a graph 800A in dimensions 810 and 811. Dimension 810 may comprise price or rate, and dimension 811 may be, in various embodiments, one of quantity, deadline, amount of work per unit time, volume of work, total duration over which work is to be performed, initial date/time for starting the work, and location at which the work is to be performed. In FIG. 8A, match 804 has been selected for removal from the user's bid, which is represented by surface 812. The new surface 813 is determined based on remaining match 803 and range end points 801 and 802. Next, in block 703, the user's bid surface is set equal to the surface that was created in block 702. This is illustrated in FIG. 8B, which shows a graph 800B with bid surface 814 that excludes match 804. In some embodiments, application of method 700 to a bid surface may remove more than one match; in such embodiments, any removed matches, except for the match that was selected in block 701, may be re-added to the user's bid surface using method 300 of FIG. 3 that was described above. In some embodiments each removed match may be re-added to the user's bid surface except for matches that cannot be re-added without also re-adding the match that was selected in block 701. It also may not be possible to remove exactly one specific match without removing any other matches in some embodiments.

Figure 9:
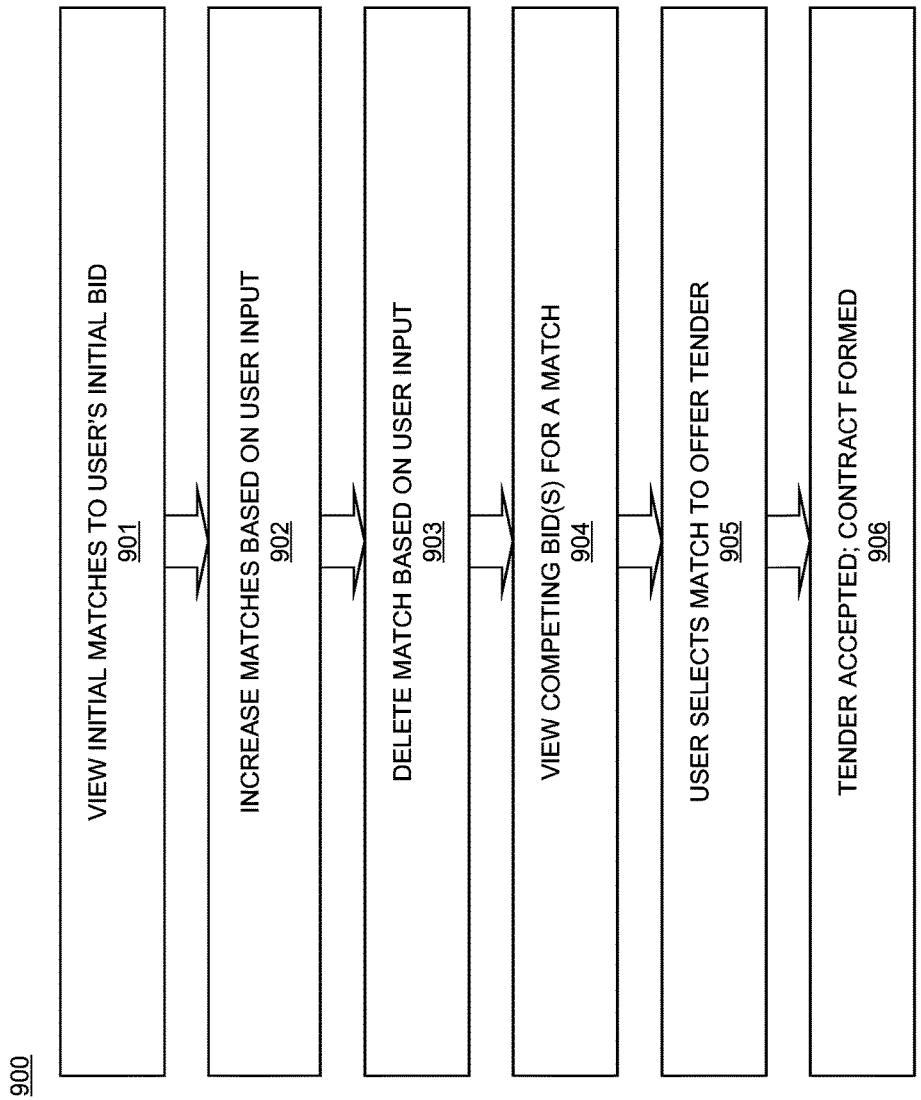
FIG. 9 depicts a process flow of a method for user interaction with a user interface for multi-dimensional surface-based bid matching in accordance with an embodiment.
Figure 10A:
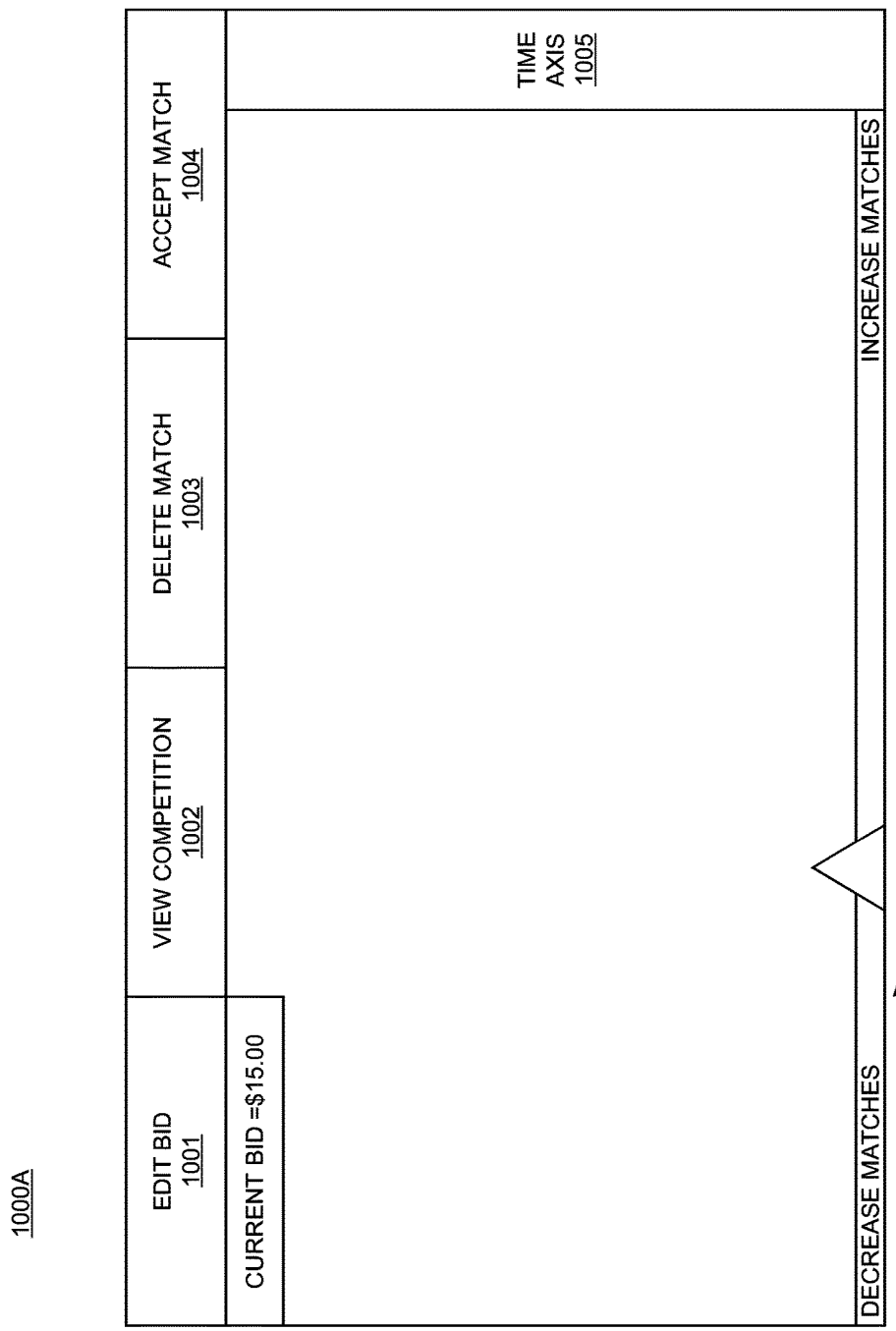
FIGS. 10A-E depict a user interface for multi-dimensional surface-based bid matching in accordance with an embodiment.

A user interface is provided so that the user may enter a bid and add and remove matches, as is discussed above with respect to FIGS. 1-8B. The various bid surfaces corresponding to bids that are stored in the system, which may be determined based on convex hull calculations, are not shown to the user via the user interface. The bid surfaces are, however, used to determine what information is displayed to the user. A method 900 for user interaction with a user interface for a bid matching system in accordance with an embodiment is shown in FIG. 9, which is discussed with respect to an example user interface that is shown in FIGS. 10A-E. First, in block 901, the user views any initial matches to a bid that was entered into the system by the user as was described above with respect to method 100 of FIG. 1. An example user interface 1000A is shown in FIG. 10A, which shows a bid by a work requester offering a flat rate of $15.00. The bid shown in FIG. 10A has no initial matches, as indicated by the empty viewing frame. The expiration of the work requester's offer is set to a default time of one day. The user interface 1000A includes an "edit bid" button 1001, a "view competition" button 1002, a "delete match" button 1003, and an "accept match" button 1004. A time scale 1005 indicates expiration of bids. A slider bar 1006 allows the user to increase or decrease the current number of matches, which causes the system to add matches as is described with respect to method 300 of FIG. 3, or remove matches as is described above with respect to method 500 of FIG. 5 or method 700 of FIG. 7. The "delete match" button 1003 also triggers method 500 of FIG. 5 or method 700 of FIG. 7 for a specific match that is designated by the user.

Figure 10B:
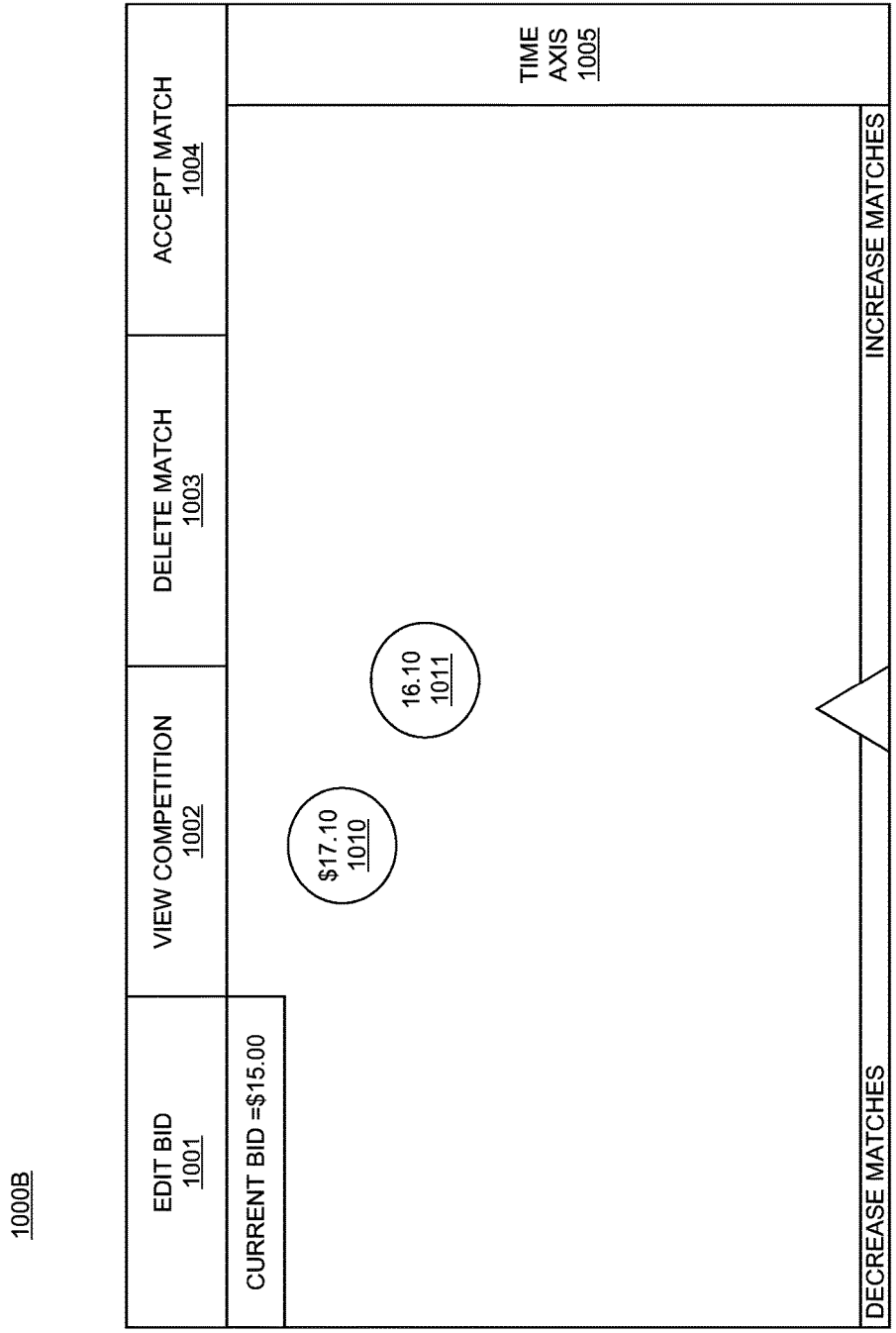

Next, in block 902 of FIG. 9, the user increases the number of matches to the current bid. This causes modification of the user's bid surface as is discussed above with respect to method 300 of FIG. 3; however, the modified bid surface is not shown to the user. FIG. 10B shows an example user interface 1000B that shows matches 1010 and 1011 of the opposite type to the user's bid. Matches 1010 and 1011 are each points on respective bid surfaces in the system, and may include a predetermined distance corresponding to a commission in some embodiments. The location of matches 1010 and 1011 with respect to the time scale 1005 may indicate the respective times to expiration of matches 1010 and 1011. The user may indicate that the number of matches should be increased by movement of slider bar 1006; the user may move the slider 1006 in a direction labeled "increase matches." The user may examine the two matches 1010 and 1011 by, for example, placing the cursor over a circle in the user interface that comprises an icon representing a particular match, which may cause a pop up displaying various attributes. Match 1010 represents a work producer offering to do work a rate of $17.10, and match 1011 offers to do work at a rate of $16.10. The work producers corresponding to matches 1010 and 1011 may also each see, in their respective user interfaces, a match corresponding to the user that is viewing user interface 1000B. Matches 1010 and 1011, together with the original $15.00 flat rate, define the user's bid surface.

Figure 10C:
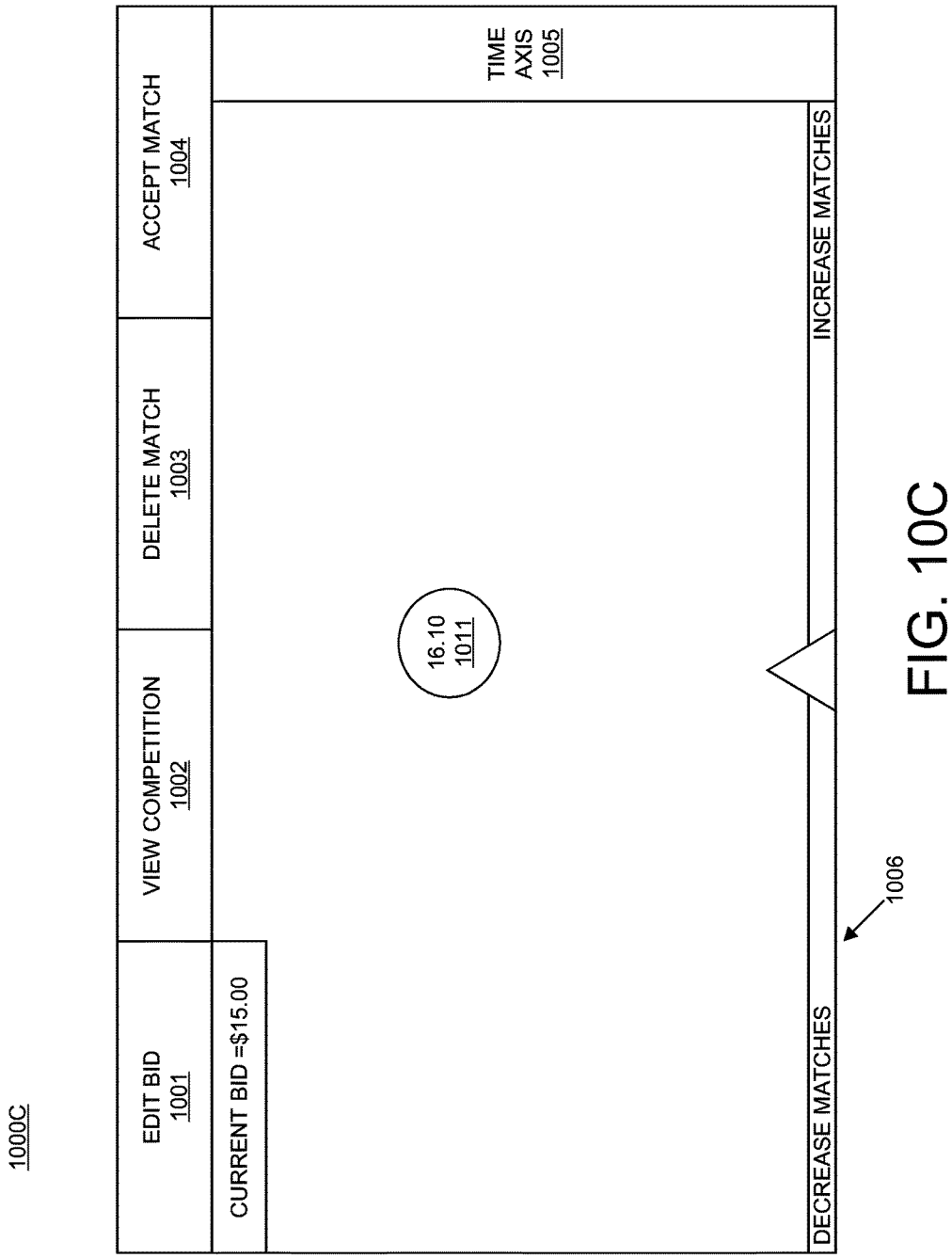

Then, in block 903 of FIG. 9, a match is deleted by the user. This causes modification of the current bid surface as is discussed above with respect to either method 500 of FIG. 5 or method 700 of FIG. 7. FIG. 10C shows an example user interface 1000C with match 1010 removed, and match 1011 remaining. The user may indicate that the number of matches should be decreased by movement of slider bar 1006, or by use of the "delete match" button 1003 to select match 1010. The corresponding match may disappear roughly simultaneously from the user's user interface, and also from the user interface corresponding to the work producer of match 1010. The location of remaining match 1011 with respect to the time scale 1005 indicates the time to expiration of match 1011. Match 1010 and the original $15.00 flat rate define the user's current bid surface.

Figure 10D:
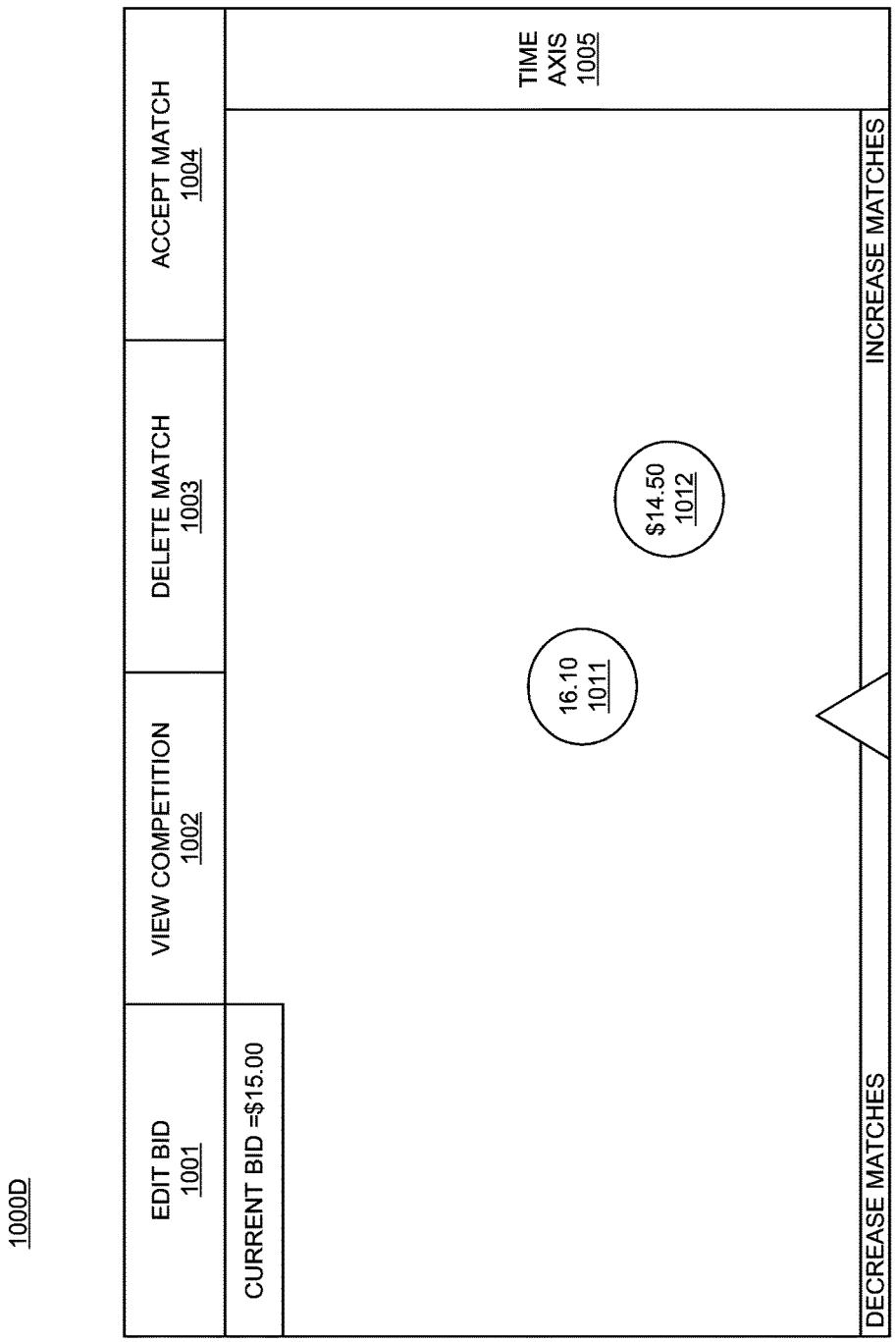
Figure 10E:
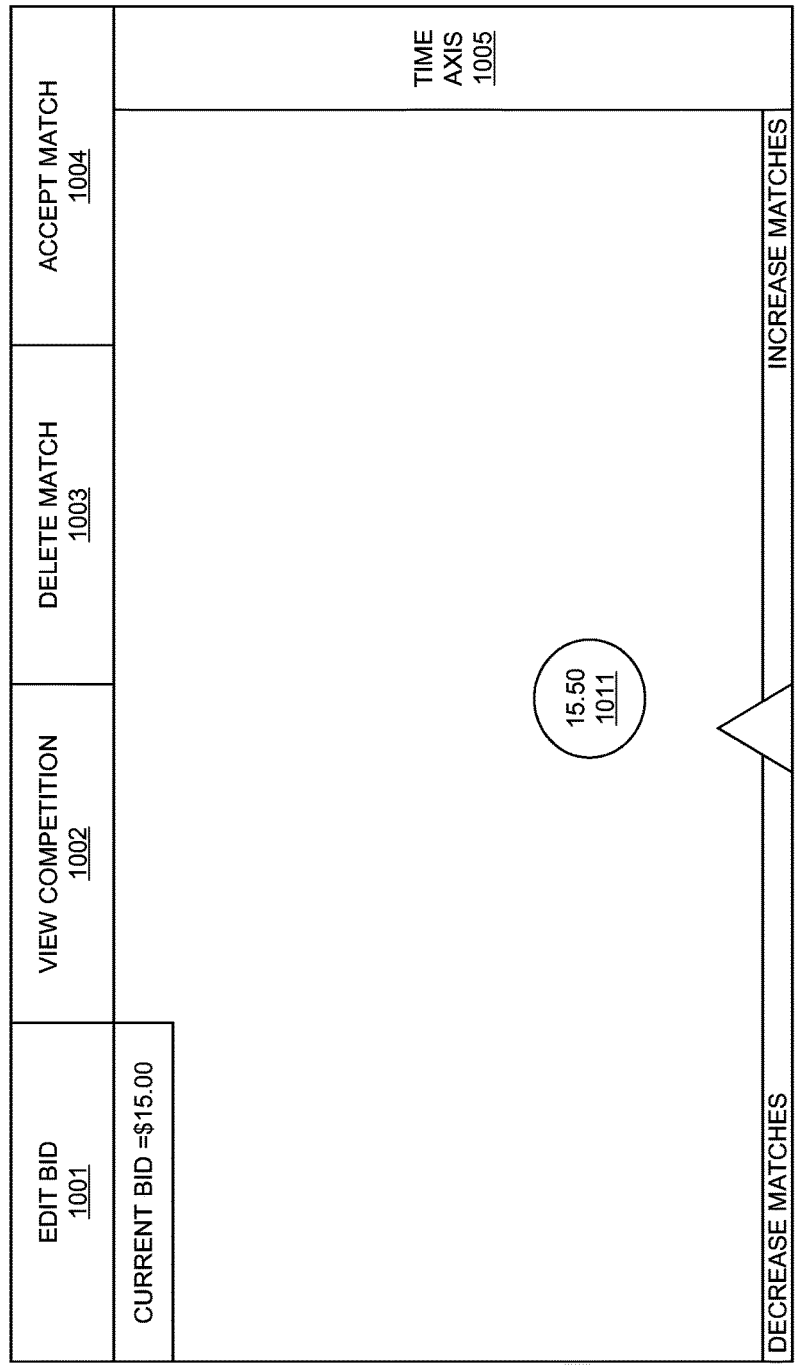

Next, in block 904, the user may choose to view competing bids of the same type as the user's bid. This displays other bids that are close to the matches that have been identified for the user's bid. FIG. 10D shows an example user interface 1000D that shows a competing bid 1012 for match 1011. The location of match 1010 and competing bid 1012 with respect to the time scale 1005 may indicate respective times to expiration of match 1010 and competing bid 1012. Competing bid 1012 may be displayed based on the user selecting match 1011 and the "view competition" button 1002. The rate offered by competing bid 1012 is $14.50, which is lower than the original rate of $15.00 offered by the user. In some embodiments, the user may choose to modify their bid based on competing bid 1012.

Then, in block 905 of FIG. 9, the user may select a match to tender an offer. If the user who made the bid corresponding to the match finds the tender acceptable, the tender may be accepted in block 906 of FIG. 9, forming a contract between a work requester and a work producer. In the example user interface 1000E of FIG. 10E, the value of match 1011 has been changed to $15.50 by the work producer who owns the corresponding bid. The user that is viewing user interface 1000E may select the "accept match" button 1004 to tender an offer to the match 1011. The tender may have a specified expiration period. The work producer may accept the tender of the work requester, creating a contract. The work requester may leave their current offer in place in the system if the work requester would like to do business with more than one work producer.

Figure 11:
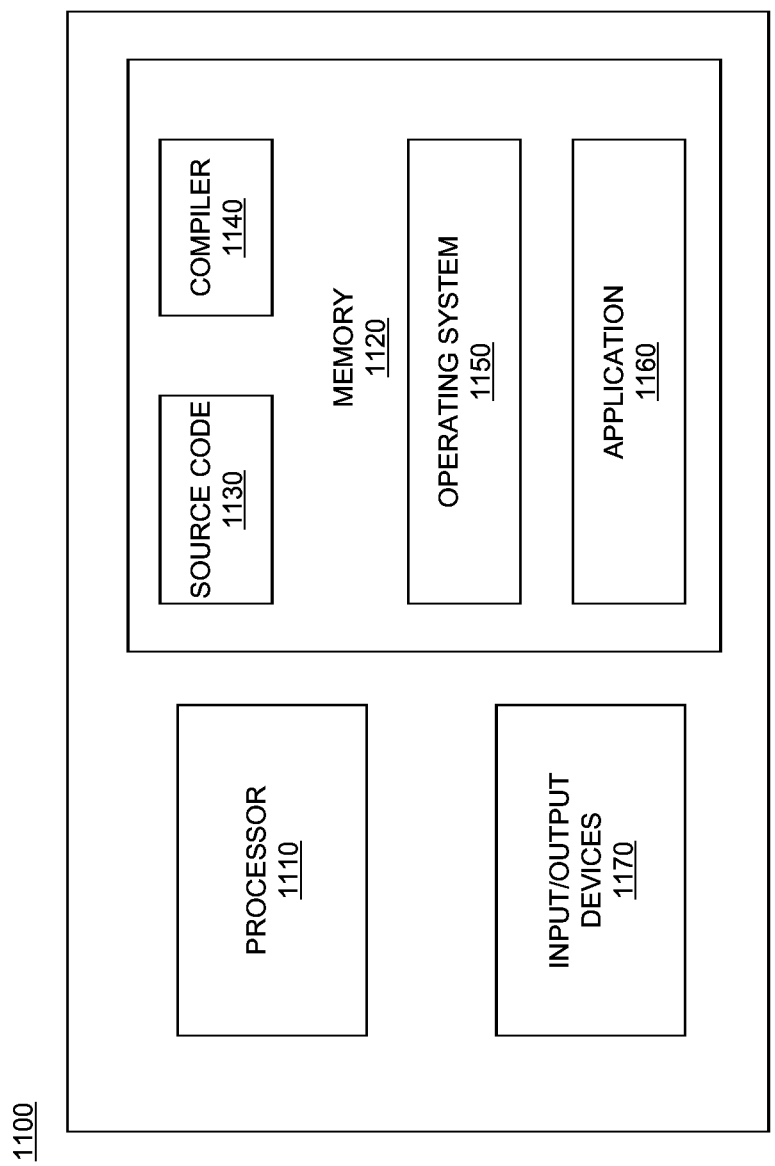
FIG. 11 depicts a computer that may be used in conjunction with multi-dimensional surface-based bid matching in accordance with an embodiment.

FIG. 11 illustrates an example of a computer 1100 which may be utilized by exemplary embodiments of multi-dimensional surface-based bid matching. Various operations discussed above may utilize the capabilities of the computer 1100. One or more of the capabilities of the computer 1100 may be incorporated in any element, module, application, and/or component discussed herein.

The computer 1100 includes, but is not limited to, PCs, workstations, laptops, PDAs, palm devices, servers, storages, and the like. Generally, in terms of hardware architecture, the computer 1100 may include one or more processors 1110, memory 1120, and one or more I/O devices 1170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1110 is a hardware device for executing software that can be stored in the memory 1120. The processor 1110 can be virtually any custom made or commercially available processor, a central processing unit (CPU), a digital signal processor (DSP), or an auxiliary processor among several processors associated with the computer 1100, and the processor 1110 may be a semiconductor based microprocessor (in the form of a microchip) or a macroprocessor.

The memory 1120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1120 may incorporate electronic, magnetic, optical, and/or other types of storage media. Note that the memory 1120 can have a distributed architecture, where various components are situated remote from one another, but can be accessed by the processor 1110.

The software in the memory 1120 may include one or more separate programs, each of which comprises an ordered listing of executable instructions for implementing logical functions. The software in the memory 1120 includes a suitable operating system (O/S) 1150, compiler 1140, source code 1130, and one or more applications 1160 in accordance with exemplary embodiments. As illustrated, the application 1160 comprises numerous functional components for implementing the features and operations of the exemplary embodiments. The application 1160 of the computer 1100 may represent various applications, computational units, logic, functional units, processes, operations, virtual entities, and/or modules in accordance with exemplary embodiments, but the application 1160 is not meant to be a limitation.

The operating system 1150 controls the execution of other computer programs, and provides scheduling, input-output control, file and data management, memory management, and communication control and related services. It is contemplated by the inventors that the application 1160 for implementing exemplary embodiments may be applicable on all commercially available operating systems.

Application 1160 may be a source program, executable program (object code), script, or any other entity comprising a set of instructions to be performed. When a source program, then the program is usually translated via a compiler (such as the compiler 1140), assembler, interpreter, or the like, which may or may not be included within the memory 1120, so as to operate properly in connection with the O/S 1150. Furthermore, the application 1160 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 1170 may include input devices such as, for example but not limited to, a mouse, keyboard, scanner, microphone, camera, etc. Furthermore, the I/O devices 1170 may also include output devices, for example but not limited to a printer, display, etc. Finally, the I/O devices 1170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1170 also include components for communicating over various networks, such as the Internet or intranet.

If the computer 1100 is a PC, workstation, intelligent device or the like, the software in the memory 1120 may further include a basic input output system (BIOS) (omitted for simplicity). The BIOS is a set of essential software routines that initialize and test hardware at startup, start the O/S 1150, and support the transfer of data among the hardware devices. The BIOS is stored in some type of read-only-memory, such as ROM, PROM, EPROM, EEPROM or the like, so that the BIOS can be executed when the computer 1100 is activated.

When the computer 1100 is in operation, the processor 1110 is configured to execute software stored within the memory 1120, to communicate data to and from the memory 1120, and to generally control operations of the computer 1100 pursuant to the software. The application 1160 and the O/S 1150 are read, in whole or in part, by the processor 1110, perhaps buffered within the processor 1110, and then executed.

When the application 1160 is implemented in software it should be noted that the application 1160 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1160 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1160 is implemented in hardware, the application 1160 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include relatively efficient matching of work producers and work requesters to form contracts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for multi-dimensional surface-based bid matching, comprising:
   providing an application specific integrated circuit comprising combinatorial logic gates customized for:
   receiving a bid from a work requester, the bid comprising a plurality of ranges, wherein each range of the plurality of ranges corresponds to a respective dimension of a plurality of dimensions, wherein
      the bid further comprises a price that varies across the plurality of ranges in the plurality of dimensions, and
      the plurality of dimensions includes at least one of a volume, a duration, a start date, and a location of work to be performed;
   determining a first bid surface in the plurality of dimensions based on the plurality of ranges of the bid of the work requester and a number of current matches specified by the work requester via a user interface, the first bid surface stored in a computer memory and not displayable via the user interface;
   modifying the first bid surface based on a match to the bid of the work requester, the match being one of the current matches, and comprising a point on a second bid surface that is closest to the first bid surface, the point corresponding to a bid from a work producer, the second bid surface stored in the computer memory and not displayable via the user interface, wherein the second bid surface does not intersect the first bid surface;
   determining an expiration time period for the bid of the work requester;
   displaying to the work requester, via the user interface, the bid and the match, wherein a location of the match in the user interface relative to a time axis in the user interface indicates an expiration time of the match; and creating an agreement between the work requester and the work producer, the creating in response to the work requester selecting the match to tender an offer via the user interface and to the work producer accepting the offer, wherein both the selecting and the accepting occur prior to an elapsing of the expiration time period for the bid and prior to the expiration time of the match.

2. The method of claim 1 comprising, before modifying the first bid surface based on the match to the bid of the work requester, determining an initial match to the bid of the work requester based on a match between the first bid surface and an additional bid surface corresponding to a bid of an additional work producer.

3. The method of claim 2, wherein the initial match is determined based on addition of a distance to a point corresponding to the match between the first bid surface and the additional bid surface, the distance corresponding to a commission.

4. The method of claim 1, wherein modifying the first bid surface based on the match to the bid of the work requester comprises adding the match, and wherein adding the match comprises:
determining a point on the second bid surface based on a distance from the point to the first bid surface, wherein the point corresponds to the match;
moving the determined point a distance away from the first bid surface;
determining a new surface based on the moved point and the first bid surface; and
setting the first bid surface equal to the new surface.

5. The method of claim 4, wherein determining the new surface comprises determining a convex hull based on the first bid surface and the moved point.

6. The method of claim 1, wherein modifying the first bid surface based on the match to the bid of the work requester comprises removing the match, and wherein removing the match comprises:
selecting a match from a set of current matches to the bid of the work requester for removal;
determining a new surface comprising a convex hull based on a set of remaining matches of the bid of the work requester, wherein the set of remaining matches does not include the selected match; and
setting the first bid surface equal to the new surface.

7. The method of claim 1, wherein modifying the first bid surface based on the match to the bid of the work requester comprises removing the match, and wherein removing the match comprises:
selecting a match from a set of current matches to the bid of the work requester for removal;
determining a new surface by moving the first bid surface a distance below the selected match; and
setting the first bid surface equal to the new surface.

8. The method of claim 1, comprising displaying to the work requester a competing bid of the match, the competing bid comprising a bid from an additional work requester.

9. A computer program product for multi-dimensional surface-based bid matching, the computer program product comprising a non-transitory computer readable storage medium having computer readable program code embodied therewith, said computer readable program code being executable by a processor to:
receive a bid from a work requester, the bid comprising a plurality of ranges, wherein each range of the plurality of ranges corresponds to a respective dimension of a plurality of dimensions, wherein
the bid further comprises a price that varies across the plurality of ranges in the plurality of dimensions, and
the plurality of dimensions includes at least one of a volume, a duration, a start date, and a location of work to be performed;
determine a first bid surface in the plurality of dimensions based on the plurality of ranges of the bid of the work requester and a number of current matches specified by the work requester via a user interface, the first bid surface stored in a computer memory and not displayable via the user interface; and
modify the first bid surface based on a match to the bid of the work requester, the match being one of the current matches, and comprising a point on a second bid surface that is closest to the first bid surface, the point corresponding to a bid from a work producer, the second bid surface stored in the computer memory and not displayable via the user interface, wherein the second bid surface does not intersect the first bid surface;
determining an expiration time period for the bid of the work requester;
displaying to the work requester, via the user interface, the bid and the match, wherein a location of the match in the user interface relative to a time axis in the user interface indicates an expiration time of the match; and
creating an agreement between the work requester and the work producer, the creating in response to the work requester selecting the match to tender an offer via the user interface and to the work producer accepting the offer, wherein both the selecting and the accepting occur prior to an elapsing of the expiration time period for the bid and prior to the expiration time of the match.

10. The computer program product of claim 9, comprising, before modifying the first bid surface based on the match to the bid of the work requester, determining an initial match to the bid of the work requester based on a match between the first bid surface and an additional bid surface corresponding to a bid of an additional work producer.

11. The computer program product of claim 10, wherein the initial match is determined based on addition of a distance to a point corresponding to the match between the first bid surface and the additional bid surface, the distance corresponding to a commission.

12. The computer program product of claim 9, wherein modifying the first bid surface based on the match to the bid of the work requester comprises adding the match, and wherein adding the match comprises:
determining a point on the second bid surface based on a distance from the point to the first bid surface, wherein the point corresponds to the match;
moving the determined point a distance away from the first bid surface;
determining a new surface based on the moved point and the first bid surface; and
setting the first bid surface equal to the new surface.

13. The computer program product of claim 12, wherein determining the new surface comprises determining a convex hull based on the first bid surface and the moved point.

14. The computer program product of claim 9, wherein modifying the first bid surface based on the match to the bid of the work requester comprises removing the match, and wherein removing the match comprises:
selecting a match from a set of current matches to the bid of the work requester for removal;

determining a new surface comprising a convex hull based on a set of remaining matches of the bid of the work requester, wherein the set of remaining matches does not include the selected match; and setting the first bid surface equal to the new surface.

15. The computer program product of claim 9, wherein modifying the first bid surface based on the match to the bid of the work requester comprises removing the match, and wherein removing the match comprises:

selecting a match from a set of current matches to the bid of the work requester for removal;

determining a new surface by moving the first bid surface a distance below the selected match; and setting the first bid surface equal to the new surface.

16. The computer program product of claim 9, comprising displaying to the work requester a competing bid of the match, the competing bid comprising a bid from an additional work requester.

17. A system for multi-dimensional surface-based bid matching comprising:

a memory, the memory module having computer readable computer instructions; and a processor for executing the computer readable instructions, the instructions including:

receiving a bid from a work requester, the bid comprising a plurality of ranges, wherein each range of the plurality of ranges corresponds to a respective dimension of a plurality of dimensions, wherein the bid further comprises a price that varies across the plurality of ranges in the plurality of dimensions, and the plurality of dimensions includes at least one of a volume, a duration, a start date, and a location of work to be performed;

determining a first bid surface in the plurality of dimensions based on the plurality of ranges of the bid of the work requester and a number of current matches specified by the work requester via a user interface, the first bid surface stored in a computer memory and not displayable via the user interface;

modifying the first bid surface based on a match to the bid of the work requester, the match being one of the current matches, and comprising a point on a second bid surface that is closest to the first bid surface, the point corresponding to a bid from a work producer, the second bid surface stored in the computer memory and not displayable via the user interface, wherein the second bid surface does not intersect the first bid surface;

determining an expiration time period for the bid of the work requester;

displaying to the work requester, via the user interface, the bid and the match, wherein a location of the match in the user interface relative to a time axis in the user interface indicates an expiration time of the match; and creating an agreement between the work requester and the work producer, the creating in response to the work requester selecting the match to tender an offer via the user interface and to the work producer accepting the offer, wherein both the selecting and the accepting occur prior to an elapsing of the expiration time period for the bid and prior to the expiration time of the match.

* * * * *